United States Patent
Diazdelcastillo

(10) Patent No.: US 9,241,442 B2
(45) Date of Patent: Jan. 26, 2016

(54) AUTONOMOUS AND REMOTE CONTROL ALL PURPOSE MACHINE (ARCAPM)

(71) Applicant: Daniel A. Diazdelcastillo, Pomfret, MD (US)

(72) Inventor: Daniel A. Diazdelcastillo, Pomfret, MD (US)

( * ) Notice: Subject to any disclaimer, the term of this patent is extended or adjusted under 35 U.S.C. 154(b) by 129 days.

(21) Appl. No.: 14/060,954

(22) Filed: Oct. 23, 2013

(65) Prior Publication Data

US 2014/0121881 A1    May 1, 2014

Related U.S. Application Data

(60) Provisional application No. 61/717,273, filed on Oct. 23, 2012.

(51) Int. Cl.
| | | |
|---|---|---|
| *G05D 1/00* | (2006.01) | |
| *B62D 55/06* | (2006.01) | |
| *A01D 42/00* | (2006.01) | |
| *A01D 34/00* | (2006.01) | |
| *A47L 9/00* | (2006.01) | |
| *G05D 1/02* | (2006.01) | |

(52) U.S. Cl.
CPC .............. *A01D 42/00* (2013.01); *A01D 34/008* (2013.01); *A47L 9/00* (2013.01); *G05D 1/0265* (2013.01); *G05D 1/0274* (2013.01); *G05D 1/0278* (2013.01); *G05D 2201/0203* (2013.01); *G05D 2201/0208* (2013.01)

(58) Field of Classification Search
CPC .............................. G05D 1/0088; B62D 55/06
USPC ............................................. 701/23; 180/9.1
See application file for complete search history.

(56) References Cited

U.S. PATENT DOCUMENTS

| | | | |
|---|---|---|---|
| 3,790,094 A | 2/1974 | Spicer | |
| 3,877,207 A | 4/1975 | Lemelson | |
| 5,988,540 A | 11/1999 | Pugh | |
| 6,336,051 B1 | 1/2002 | Pangels et al. | |
| 6,338,013 B1 * | 1/2002 | Ruffner | 701/23 |
| 6,580,246 B2 | 6/2003 | Jacobs | |
| 6,606,845 B1 * | 8/2003 | Spies | 56/16.7 |
| 6,667,592 B2 | 12/2003 | Jacobs et al. | |

(Continued)

OTHER PUBLICATIONS

Shiel, et al., "Low Back Pain Causes, Exercises, Treatment Options, Backache Relief", MedicineNet.com, Mar. 12, 2012; 3 pages.

*Primary Examiner* — John Q Nguyen
*Assistant Examiner* — Anshul Sood
(74) *Attorney, Agent, or Firm* — Andrew D. Wright; Roberts Mlotkowski Safran & Cole, P.C.

(57) ABSTRACT

A autonomous and remote control all purpose machine (AR-CAPM) having different interchangeable modules that are structured and arranged to perform different tasks is disclosed. A machine includes: a body; a plurality of bays in the body, wherein each bay is configured to receive a respective module; and a power source carried by the body. A respective power connector is in each one of the bays that is configured to provide an electrically conductive path between the power source and a device in a module arranged in one of the bays. The machine includes a propulsion system structured and arranged to move the body over the ground. The machine also includes a control system structured and arranged to control autonomous movement of the machine based on at least one of: proximity sensors, metal detectors, and GPS data.

18 Claims, 15 Drawing Sheets

(56) References Cited

U.S. PATENT DOCUMENTS

| | | |
|---|---|---|
| 7,103,457 B2 | 9/2006 | Dean |
| 7,113,847 B2 | 9/2006 | Chmura et al. |
| 7,953,526 B2 | 5/2011 | Durkos et al. |
| 2005/0126146 A1* | 6/2005 | Velke et al. ............. 56/16.7 |
| 2008/0105445 A1* | 5/2008 | Dayton et al. ............ 172/105 |
| 2008/0289311 A1* | 11/2008 | Greene et al. ............. 56/255 |
| 2009/0077808 A1* | 3/2009 | Malm ..................... 29/897 |
| 2009/0255228 A1* | 10/2009 | Sprinkmann ............ 56/16.7 |

\* cited by examiner

AUTONOMOUS AND REMOTE CONTROL ALL PURPOSE MACHINE (ARCAPM)

BACKGROUND

Yard work and similar tasks (e.g., raking leaves, cutting grass, shoveling snow, etc.) are prohibitively difficult for some individuals. For example, removing leaves is a problem for some people. In particular, removing leaves is a very tiring and time-consuming task for many, especially for the elderly and the disabled. The problem is compounded by the need to repeat the task multiple times each season. Manual raking takes a lot of time especially if an individual has a large yard. Continuous raking over a long period of time is very time consuming and can lead to injury even for an average person. As but one example, there were 12,000 injuries in 2004 due to raking leaves. Similarly, there are accounts of people suffering heart attacks when doing strenuous activities such as shoveling snow.

There are many devices specifically suited to yard work and associated tasks, such as rakes, brooms, vacuums, leaf blowers, lawnmowers, etc. Operating such devices can be challenging, if not impossible, for some people. Moreover, although using a leaf blower can decrease the time it takes to rake the yard in less than half the time it takes to use a hand rake, there is a large amount of human manipulation and handling of the leaf blower during the process.

SUMMARY

The invention generally relates to a machine designed to assist people in completing normally manual tasks. More specifically, the invention relates to autonomous and remote control all purpose machine (ARCAPM) having different interchangeable modules that are structured and arranged to perform different tasks, such as grass cutting, leaf vacuuming and shredding, tilling, and snow blowing, to name but a few examples. Implementations of the invention can incorporate multiple removable modules that perform a variety of tasks, from mechanically related work, to help with gardening, to providing transportation on off main roads, in order to free people from these arduous tasks. The ARCAPM can also provide security aid to police and the armed forces, such as disarming bombs and other tasks which may be implemented in versions of the ARCAPM.

In an embodiment, the ARCAPM is an autonomous device the movement of which is automatically controlled by at least one of its sensors, cameras, or GPS. In other embodiments, the ARCAPM can be remotely controlled by a user with a remote control device. In further embodiments, the ARCAPM is programmed with a route of movement using GPS and a software mapping feature. In still further embodiments, the ARCAPM could be manually controlled by a rider. The ARCAPM may include one or more elements, features, and/or functions described herein, such as movement control, computer devices, etc.

In an exemplary embodiment, the ARCAPM is a battery-powered, self-propelled, multi-purpose machine that is about 4.5 feet long, about 2.5 feet wide, and about 2.0 feet tall, although the invention is not limited to these dimensions, and other sizes may be used within the scope of the invention. The ARCAPM is multi-purpose in that it can be used to accomplish multiple different tasks using removable and replaceable modules. These modules can be replaced with differently modules to do a specific job. For example, for gardening purposes the ARCAPM can be equipped with a rototiller module, a weed/grass trimmer module, a leaf vacuum shredder module, or a rake/broom module. In a specific gardening implementation, specially designed bags may be hung from two sides of the ARCAPM, the bags being provided with pockets that may be used to hold tools. The ARCAPM may be designed to work with up to three modules simultaneously, although it is preferable to operate one module at a time to preserve battery power. In the chassis of the ARCAPM, there may a power supply, such as a gasoline engine, rechargeable batteries, or the like, that provide power for propelling the ARCAPM and for powering motors in the modules.

The ARCAPM may be designed to utilize many different interchangeable modules. The modules described herein are exemplary and are not intended to limit the scope of the invention. Examples of modules that may be used with the ARCAPM include: leaf vacuum shredder; rototiller; weed/grass trimmer; air compressor; external vacuum with hose; water jet; rakes/brooms; snow blower; shovel; broadcast spreader (for salt or fertilizer; bomb disarming and/or disposal.

In aspects described herein, changing the working configuration of the ARCAPM is done by changing or replacing the various modules. The modules may have different sizes to accommodate different types of machinery. The modules can easily be removed and inserted by snap-on clips on the sides. Electrical power automatically goes to the device because of power receptacles built into the module.

In embodiments, each of the interchangeable modules has an electrical connector (e.g., receptacle) that is configured to mate with a corresponding electrical connector (e.g., receptacle) in one of the module locations (e.g., module receiving bays). All of the interchangeable modules may have a common size connector so that only a single corresponding connector is provided in each respective one of the module locations. The size and shape of the interchangeable modules and module locations may be structured and arranged in such a way that the connector on a given interchangeable module automatically moves into contact with the corresponding connector in a particular one of the module locations when the given interchangeable module is properly inserted into (e.g., installed in) the particular module location. In this manner, a user simply needs to slide the particular interchangeable module into a module location, and the electrical connection is automatically made between the interchangeable module and the module location. Proper provisions for different countries electrical connection will be made, depending to what country the ARCAPM is to be sold or exported The ARCAPM is self-propelled by at least one drive motor and propulsion system. The ARCAPM may be configured with the capacity to pull or carry about 400 pounds utilizing two electric drive motors and due to the high torque and traction with the ground provided by a propulsion system comprising tank-like treads, e.g., endless treads. The ARCAPM may be configured to weigh about 350 pounds when equipped with four equivalent heavy-duty electric car batteries.

In accordance with aspects of the invention, the ARCAPM includes and carries its own power supply, which may be in the form of a gasoline engine, rechargeable batteries, or the like. In some embodiments, the ARCAPM includes four rechargeable batteries: two batteries dedicated to two electric drive motors (i.e., one battery per motor), and two batteries to supply power to the modules. The batteries may be placed in any desired location in the ARCAPM, and preferably are placed strategically to purposefully locate the center of gravity of the ARCAPM. In embodiments, the batteries are sized to provide a minimum of three hours of use of the ARCAPM when the batteries are fully charged, depending on the job and the number of tasks done at the same time. When a gasoline engine is used, the ARCAPM may include a device that generates electrical power to charge the batteries.

The batteries in the ARCAPM may be re-charged in any suitable manner. In some embodiments, a charger is carried on the ARCAPM and the batteries are re-charged by a user connecting an extension cord between an electrical outlet (e.g., at a house or garage) and an outlet associated with the charger on the ARCAPM. In some embodiments, a permanent charging station is installed as an additional module to the ARCAPM. The permanent charging station may constantly send and receive location signals to and from the ARCAPM so the ARCAPM can track itself back to the charging station automatically after completing an assigned task. The ARCAPM may use a combination of GPS data, charging station signals and recorded previous assigned tasks to automatically calculate the shortest and safest route back to the charging station.

The ARCAPM may be designed to utilize many different interchangeable modules. The following module descriptions are for illustrative purposes and are not intended to limit the invention. The modules in accordance with aspects of the invention may have additional and/or different functionality than that described here. The following modules are described with respect to first, second, and third module locations (e.g., bays) in the ARCAPM. However, the following modules are not limited to any single module location (first, second, and third), and instead may be used in any suitable module location within the ARCAPM. Also, the ARCAPM is not limited to three module locations, and may have more or fewer module locations. Further, the ARCAPM is not limited to the dimensions and spatial arrangement of the module locations shown and described herein, and instead may have any suitable size for each module location with the module locations spatially arranged in any suitable manner within the ARCAPM.

The ARCAPM may include a leaf vacuum shredder module. The leaf vacuum shredder module vacuums leaves and other debris that are under the ARCAPM. In embodiments, while the ARCAPM is moving forward or in reverse, a vacuum in the leaf vacuum shredder module sucks leaves and debris through a suction intake. The leaf vacuum shredder module directs the leaves and debris from the suction intake into a shredder inside the module. The shredder may shred the leaves and debris with a predefined ratio, e.g., or 16:1 or other ratio. A ratio of 16:1, for example, means that the shredder shreds the leaves to such a size that 1 bag of shredded leaves equals 16 bags of unshredded leaves. This provides the capability to vacuum and shred more area of the yard without having to dump the bag of leaves very often. In embodiments, the leaf vacuum shredder module directs the shredded leaves to one or more bags that are attached to the ARCAPM, e.g., resting on the top surface of the ARCAPM, hanging from the ARCAPM, etc. The leaf vacuum shredder module is preferably placed in the third module location since it may be relatively large and heavy. The leaf vacuum shredder module may include one or more motors that provide the vacuum suction and that turn the shredder. The motors may be in the module and powered by electricity provided by batteries that are carried by the ARCAPM and separate from the module.

The ARCAPM may include a rototiller module. The rototiller module may be placed in the third module location. In embodiments, the rototiller module tills/"shakes"/mixes the ground, e.g., for gardening purposes. The rototiller module may include tilling blades that are forced into the ground under the ARCAPM to till the ground. The rototiller module may employ a hydraulic system to force the blades into the ground. The rototiller module may be adapted to continuously till as long as the user puts a specific program to automatically run within a certain area, or can be used with a remote control. One or more components of the rototiller module may be powered by electricity provided by batteries that are carried by the ARCAPM and separate from the module.

The ARCAPM may include a weed/grass trimmer module. In some embodiments, the weed/grass trimmer module is placed in the second module location, e.g., at a middle location between the first and third module locations. In embodiments, the weed/grass trimmer module includes plastic or metal strings/bands revolving at a high velocity from a small motor. The plastic or metal string rotates at a high speed to cut the grass. The weed/grass trimmer module may be used as a lawn mower. The plastic or metal string may be rotated by a motor included in the module that is powered by electricity provided by batteries that are carried by the ARCAPM and separate from the module.

The ARCAPM may include an air compressor module. The air compressor module may be placed in the third module location. The air compressor module may be used in many situations and mechanical purposes, such as pumping up tires, inflating devices, and blowing air for specific tasks. The air compressor module may include an electric powered compressor, a holding tank, and a hose with an outlet port. For example, the compressor pressurizes the air in the tank, and the hose that is connected to the tank may be used to deliver the compressed air from the tank via the outlet port to tires, pneumatic tools, etc. The air compressor may be included in the module and powered by electricity provided by batteries that are carried by the ARCAPM and separate from the module. Alternatively, the ARCAPM may carry a separate tank of compressed air that is filled from the ARCAPM compressor.

The ARCAPM may include an external vacuum with hose module. In embodiments, the external vacuum with hose module included a vacuum that has an external house that is attached from the outside. The vacuum may be placed in the third module location. The external hose may be any suitable length, e.g., 10 ft or other, and may be attached from the top of the ARCAPM. The external vacuum with hose module functions to vacuum leaves or other debris and collect it in a bag, without routing the debris through a shredder. There can be different shape and size attachments for different vacuuming purposes. The vacuum (e.g., suction) may be provided by one or more vacuum motors in the module that are powered by electricity provided by batteries that are carried by the ARCAPM and separate from the module.

The ARCAPM may include a water jet module. The water jet module may be placed in the third module location. In embodiments, the water jet module produces high pressure jet stream(s) of water or other fluid, the stream(s) being pointed at selected angle downwards for the purpose to clean a floor such as concrete (e.g., sidewalk, driveway, garage floor, etc.), were there can be multiple stains due to natural effects or human abuse. The water jet module may also include an accessory hose attachment to manually direct the jet stream for cleaning objects or walls, e.g., in the manner or a pressure washer. The water may be supplied from an external water source such as hose attached to the ARCAPM. Alternatively, the ARCAPM may carry a water tank, such as a 2, 5, 10, or 50 gallon or other size tank, for providing water to the water jet module without having to rely on a hose attachment. The water may be pressurized by one or more pumps in the water jet module that are powered by electricity provided by batteries that are carried by the ARCAPM and separate from the module.

The ARCAPM may include a rake/broom module. The rake/broom module may be placed in the first module location, e.g., at the front of the ARCAPM. In embodiments, the rake/broom module functions to lift leaves and debris from the bottom of the ground and bring it to the surface, so the vacuum or the vacuum shredder "sucks" all the debris. The rake/broom module may be configured to include a rake and/or brush that moves side to side and front and back which lifts debris and leaves off the ground. The movement of the rake and/or broom may be provided by one or more motors in the rake/broom module that are powered by electricity provided by batteries that are carried by the ARCAPM and separate from the module.

The ARCAPM may include a snow blower module. The snow blower module may be placed in the third module location, e.g., at the rear of the ARCAPM. In embodiments, the snow blower module includes a revolving screw underneath the ARCAPM, which directs snow from underneath the ARCAPM to the top of the ARCAPM where a blower blows the snow away from the ARCAPM. The snow blower module may include a moveable conduit at the blower end for selecting a direction to blow the snow. The screw and blower may be powered by electricity provided by batteries that are carried by the ARCAPM and separate from the module.

The ARCAPM may include a shovel/plow module. The shovel/plow module may be attached externally to the front end of the ARCAPM. For example, the front of the ARCAPM may include one or more hooks for supporting a shovel/plow module. The shovel/plow module may be advantageously used when remotely controlling the ARCAPM to plow logs, snow, rocks etc.

The ARCAPM may include a defroster, also referred to as a broadcast spreader module. This module may be placed in the second module location. In embodiments, the broadcast spreader module comprises a device that sprinkles salt or any other chemicals onto surfaces under the ARCAPM, e.g., to melt snow/ice on such surfaces. The broadcast spreader module may also be used to spread any desired granular material, such as grass seed, fertilizer, etc.

In aspects of the invention, the ARCAPM is self-propelled. In some embodiments, the entire system is on a tank-like chassis with tank-like treads, such that the movement of the ARCAPM is like that of a tank. For example, with left and right tank treads, to turn left, the left tread stops or moves in reverse while the right tread moves forward. In a tank-like configuration, the ARCAPM can rotate 360 degrees in its standing place. The tank-like tread allows the ARCAPM to have more traction on all surfaces and permit the ARCAPM to operate on nearly any type of terrain and slope. In embodiments, there are two electric motors that propel the ARCAPM, one motor for driving each respective tank tread. Both independent motors have high torque and propel the ARCAPM at high speeds, e.g., speeds of up to 20 mph. This configuration provides the ARCAPM with the capability to climb over large rocks and obstacles due to the high torque of its electric motors and the design of the tank-like treads. The ARCAPM is not limited to tank treads, however, and may also be implemented with wheels (e.g., four or six wheels, as on an all terrain vehicle).

In further aspects of the invention, the ARCAPM has a control interface for a user to interface with the machine. In embodiments, the control interface comprises a dashboard that comprises a touch-screen interface, e.g., similar to a tablet computer or smartphone. The dashboard is the area where a user touches a button or screen that tells the ARCAPM to perform a certain task. The touch screen may also display information such as date and time, GPS reception, battery charge, indicators showing the function of the modules, and indicators showing the detection/sensing devices that monitors the ARCAPM systems. In embodiments, the data displayed at the dashboard is provided by a computer device that includes a processor, a memory, and programming to achieve the functions described herein. The dashboard may be, but is not limited to, a computer-based touch screen that displays a graphic user interface (GUI) to a user, receives touch-based inputs from the user, and changes the display and/or performs one or more functions based upon the received touch-based inputs.

An exemplary set of inputs from the user is illustrated in the following computer touch screen interface provided by the Dashboard:

1. ON/OFF. The user turns the ARCAPM on or off.
2. (Option with a check next to it) Module 1, Module 2, Module 3. The user selects one of the first, second, and third module locations.
3. (Option with a check for which device for each Module) Leaf vacuum shredder, Rototiller, Weed/grass trimmer, Air compressor, External vacuum with hose, Water jet, Rakes/brooms, Snow blower, shovel, broadcast spreader, telescopic arms, and others. The user designates which interchangeable module is installed in the module location selected at step 2. Alternatively, the ARCAPM may be programmed to automatically determine the identity (e.g., type) of an installed interchangeable module, such that the user does not manually enter this information at step 3.
4. *For specific tasks such as leaf vacuum shredder, shovel, snow blower, there will be an option for "on solid ground" (asphalt, concrete, sidewalk etc.) and "All terrain/soil" (grass, rock, mud etc.). The user inputs a type of surface that the ARCAPM will be operating on, and the ARCAPM changes propulsion controls accordingly.
5. Turn module 1, 2 and/or 3 on/off.
6. Option: "Metal detection fence", and "Input Station for GPS coordinates".
7. Under "Input GPS coordinates", able to set up coordinates, save coordinates and save as favorite and home. Can name different locations and coordinates of the yard you want to do the job on. The computer memory can store settings once they have been input by a user using the dashboard. In this manner, the user may select a saved task, and the ARCAPM will populate all of the setting from the saved settings. For example, the user may save a job (e.g., Leaf vacuum shredder, terrain, GPS, etc.), and then later simply select the saved job rather than re-enter all of the data again. In this manner, the user may use the save data when repeating a task (e.g., raking the leaves in the same yard next week).
8. Once all the above steps have been completed in the order, which would automatically show in the dashboard, the final step is to press "Start Program".

At step #4, the reason for this button is because for different devices, different speeds are required on different terrain. For example, it takes more time to vacuum and shred leaves that are on the grass compared to the asphalt. The selection at step 4 automatically sets the automated speed at a lower speed than usual so it does not rip and tear the ground when the ARCAPM is rotating left, right or moving in circles. For example, the ARCAPM could start from a charging station. A person may flip the ARCAPM on the side to replace a module to do a certain task, such as vacuum shred the leaves autonomously first, then pump up the tires in a car, and then go to the garden and rototill the ground for a new garden. Depending on where the ARCAPM will be vacuuming and shredding the leaves, the interface will issue different commands at the appropriate time.

Movement of the ARCAPM may be controlled using cameras, sensors, manually held remote control device, and/or GPS. Movement may also be controlled by a user riding the ARCAPM. The movement varies depending on the selection made by the user.

In embodiments, movement of the ARCAPM is controlled by proximity sensors, such as cameras, sonar, and/or touch sensors. Data from the sensors may be provided to a computer controller that controls the propulsion system. When the data from the sensors indicates that the ARCAPM is touching or within a pre-defined range of an obstacle, the controller causes the propulsion system to change course to avoid the detected obstacle. There may be any desired number of proximity sensors on the ARCAPM, such as six cameras that provide a 3D perspective of the landscape around the ARCAPM. Once the ARCAPM gets to a certain distance the cameras detect the object and the ARCAPM stops and turns around or turns in a different direction to avoid the obstacle.

In embodiments, movement of the ARCAPM is controlled by metal detection. A boundary may be set up using a metal wire, e.g., similar to an invisible fence for pets. In this implementation, the ARCAPM uses sensors to detect when it travels over the wire. The computer controller controls the propulsion system to change the direction of movement of ARCAPM to move away from the location where it detected the wire. For example, when the ARCAPM detects the wire, the computer controller may cause the ARCAPM to move backward a predefined distance, turn a predefined angle to define a new path, and begin moving forward along the new path until the next time it detects the wire. In this manner, the ARCAPM may be configured to move and stay within a boundary defined by the wire.

In embodiments, movement of the ARCAPM is controlled by Global Positioning System (GPS). As is well understood, a Global Positioning System is a satellite-based navigation system made up of a network of satellites orbiting the earth. The satellites constantly transmit information (pseudorandom code, ephemeris data and almanac data) to earth with frequency of 1575.42 MHz in the UHF band. A GPS receiver in a device receives the satellite information and use triangulation to calculate an exact location of the device. To determine an exact location, there must be at least three satellites for the system to work. In embodiments, the ARCAPM includes a GPS receiver that is connected to a computer controller. Using GPS allows the ARCAPM to stay within a certain boundary inputted by the user in the dashboard. The GPS coordinates input by the user at the dashboard make an invisible boundary within which the ARCAPM stays when moving. The GPS movement control may be used in addition to the other systems described herein, e.g., proximity sensors and metal detection.

In embodiments, movement of the ARCAPM is controlled by a user with remote control. A remote control receiver may be wired to the main computer (e.g., computer controller) in the ARCAPM. When a remote control is turned on by a user, the remote control receiver receives a signal and causes the computer controller to override the other control systems, e.g., proximity sensor, metal detector, GPS. This permits the user to control the movement direction and speed of the ARCAPM using a remote control device, e.g., a hand held device that communicates wirelessly with the remote control receiver.

The ARCAPM may be provided with additional sensors such as leaf sensors, bag-full sensors. Leaf sensors may be arranged at the rear of the ARCAPM to detect when leaves have been missed when the ARCAPM is moving forward. The leaf sensors may be video sensors that are connected to the controller, which causes the ARCAPM to stop and back up when leaves are detected. In this manner, when leaves are missed, the ARCAPM will back up and re-vacuum the area until the leaves are completely vacuumed. Bag-full sensors may be configured to detect the amount of leaves in the bag(s) carried by the ARCAPM. The bag-full sensors may be configured to detect a size and/or weight of the bag, and communicate this data to the computer controller, which may stop the vacuuming operation until the bag is emptied.

According to aspects of the invention, there is a system that includes: a frame/chassis that carries at least one module location; a plurality of interchangeable modules that can be inserted into and taken out of the module location in the frame/chassis; a propulsion unit on the frame/chassis for moving the frame/chassis along a surface (e.g., ground, driveway, sidewalk, etc.); a power source for the propulsion unit on the frame/chassis; a power source for any of the interchangeable modules that are installed in the frame/chassis; and a control system that controls autonomous movement of the frame/chassis according to at least one of: GPS, sonar, metal-detector and buried wire (e.g., invisible fence), camera sensors, and bump sensors.

The system may further comprise a dashboard that provides the user with an interface for providing input to the control system, wherein the dashboard is a touch screen GUI mounted on the frame/chassis. The system may further comprise a remote control system, wherein the user can control the movement of the frame/chassis using a hand-held wireless remote control unit that overrides the autonomous control. The system may further comprise a handlebar with a manual throttle, and further comprises foot locations and a brake, such that the user can ride on and manually/directly control the movement of the frame/chassis. The system may further comprise a tow hook sticking out from or embedded into the rear end of the frame/chassis.

The propulsion unit may comprise two tank treads and two independent motors for driving the tank treads. In an embodiment, both power sources are rechargeable batteries. The system may further comprise a charging station that is configured to recharge the rechargeable batteries. In an embodiment, the control system automatically determines the type of interchangeable module that is installed in any one of the module locations. In an embodiment, the interchangeable module and module locations are configured with corresponding electrical connections that automatically connect when installed.

In a first aspect of the invention, there is a machine comprising: a body; a plurality of bays in the body, wherein each bay is configured to receive a respective module; and a power source carried by the body. A respective power connector is in each one of the bays that is configured to provide an electrically conductive path between the power source and a device in a said module arranged in one of the bays. The machine comprises a propulsion system structured and arranged to move the body over the ground. The machine also comprises a control system structured and arranged to control autonomous movement of the machine based on at least one of: proximity sensors, metal detectors, and GPS data.

In a second aspect of the invention, there is a system comprising a machine and a plurality of modules. The machine comprises: a body; at least one bay in the body, wherein the at least one bay is configured to receive a respective one of the plurality of modules; and a power source carried by the body. The machine also comprises a power connector in the at least one bay that is configured to provide an electrically conductive path between the power source and a device in the respective one of the plurality of modules arranged in the at least one bay. The machine additionally comprises a propulsion system structured and arranged to move the body over the ground. The machine further comprises a control system structured and arranged to control autonomous movement of the machine based on at least one of: proximity sensors, metal detectors, and GPS data. The plurality of modules are selected from a group consisting of: leaf vacuum shredder module; rototiller module; weed/grass trimmer module; air compressor module; external vacuum with hose module; water jet module; rake/broom module; snow blower module; shovel module; and broadcast spreader module for ice melting.

BRIEF DESCRIPTION OF THE SEVERAL VIEWS OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
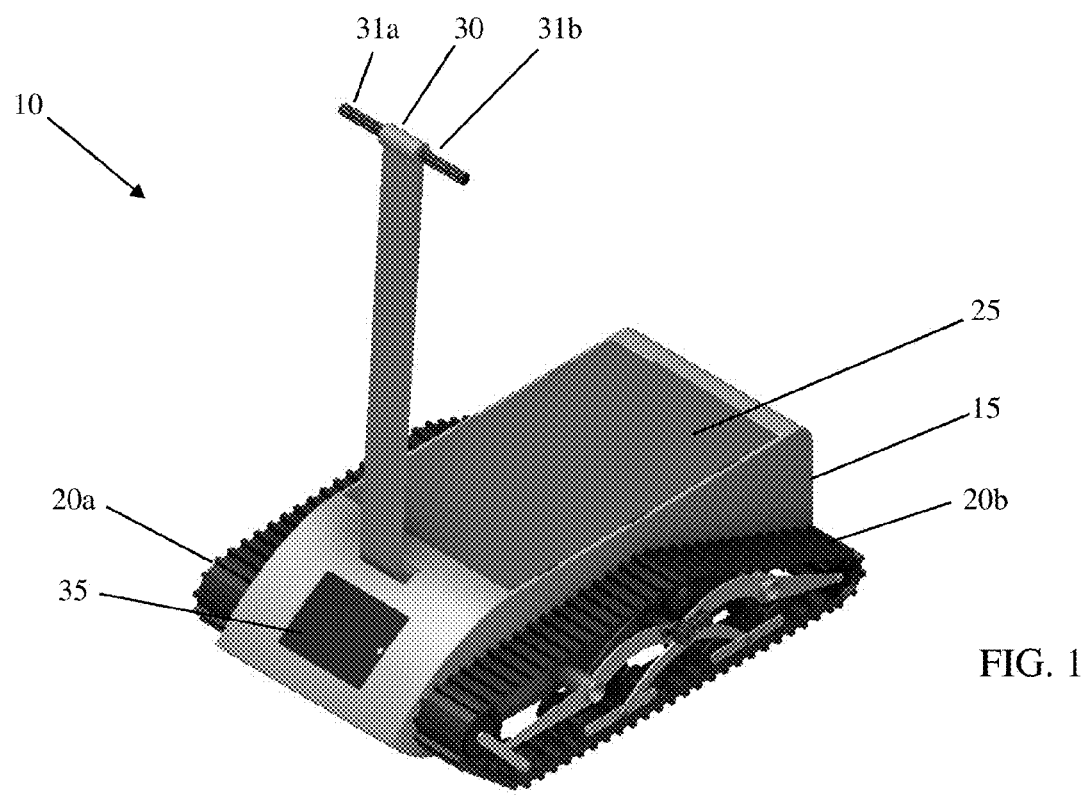
FIGS. 1, 2, 3A, and 3B show perspective views of a first embodiment of a machine in accordance with aspects of the invention.
Figure 2:
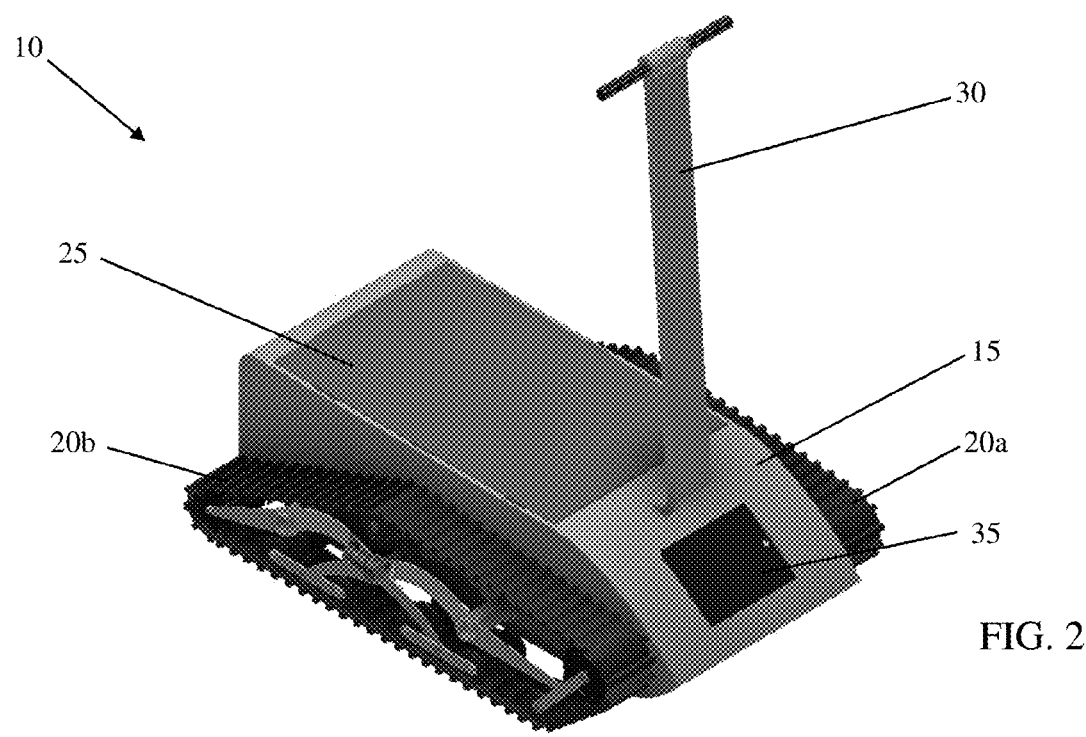

FIGS. 1, 2, 3A, and 3B show perspective views of a first embodiment of a machine 10, e.g., an ARCAPM, in accordance with aspects of the invention. With reference to FIGS. 1 and 2, the machine 10 includes a body 15 and propulsion systems 20a and 20b. The body 15 may be any structure suitable for supporting the propulsion systems 20a and 20b and carrying the modules as described herein. For example, the body 15 may comprise a chassis, frame, etc. The propulsion systems 20a and 20b are shown as tank-like treads that operate in a conventional manner, e.g., to provide forward, backward, and turning movement for the machine 10. The invention is not limited to treads, however, and the propulsion systems 20a and 20b may comprise other systems, such as wheels, tires, etc.

In embodiments, the machine 10 includes a cover 25 that is removable, attached to the body 15 and that covers bays 45a, 45b, 45c (e.g., module locations) contained within the body 15 that receive various modules 40a, 40b, 40c, as described in greater detail herein. The machine 10 may also include a handlebar 30 attached to the body. In embodiments, the handlebar 30 includes manual propulsion controls 31a and 31b that independently control the forward and backward movement of propulsion systems 20a and 20b. For example, propulsion control 31a may be a twist throttle, thumb throttle, or the like, the controls the direction and speed of propulsion system 20a. Similarly, propulsion control 31b may be a twist throttle, thumb throttle, or the like, the controls the direction and speed of propulsion system 20b. The use of individually controllable and reversible treads for the propulsion systems 20a and 20b provides the ability to make zero point turns. In embodiments, the machine 10 includes a user interface 35, e.g., a dashboard, as described in greater detail herein.

Figure 3A:
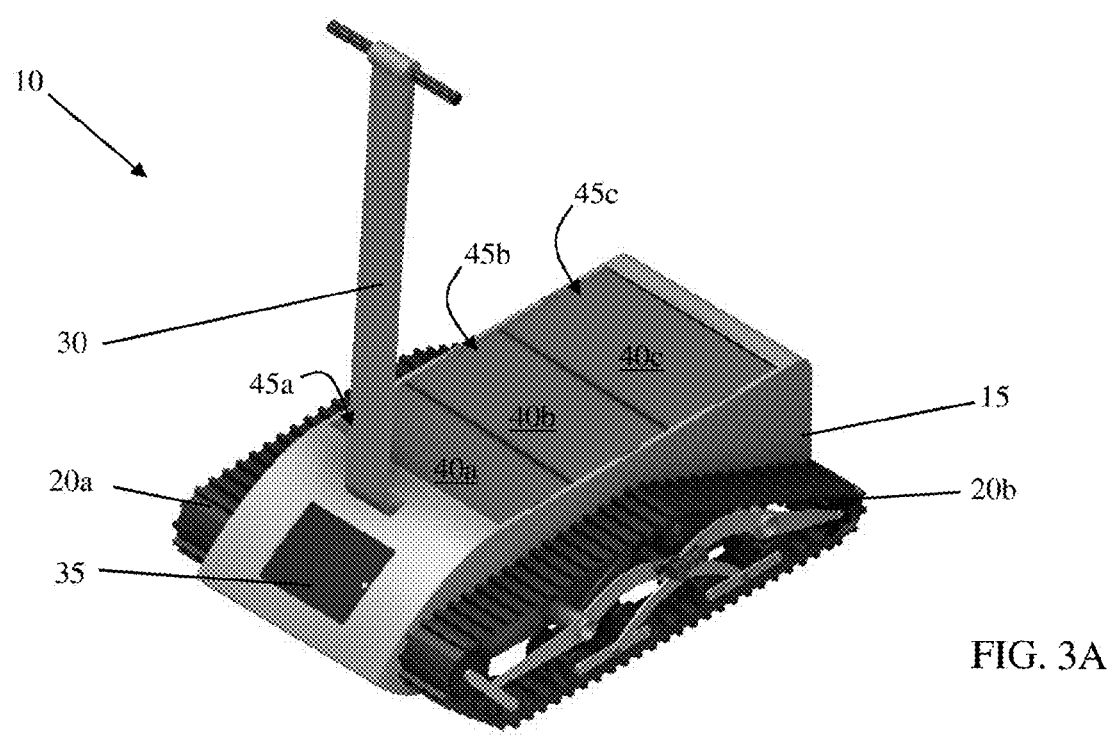
Figure 3B:
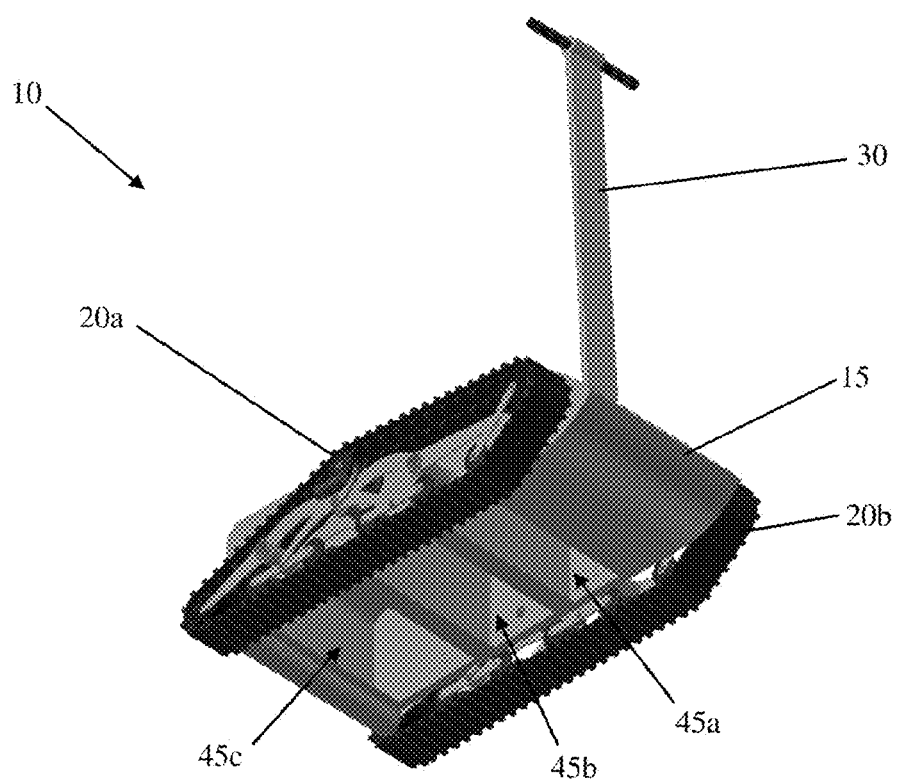
Figure 4:
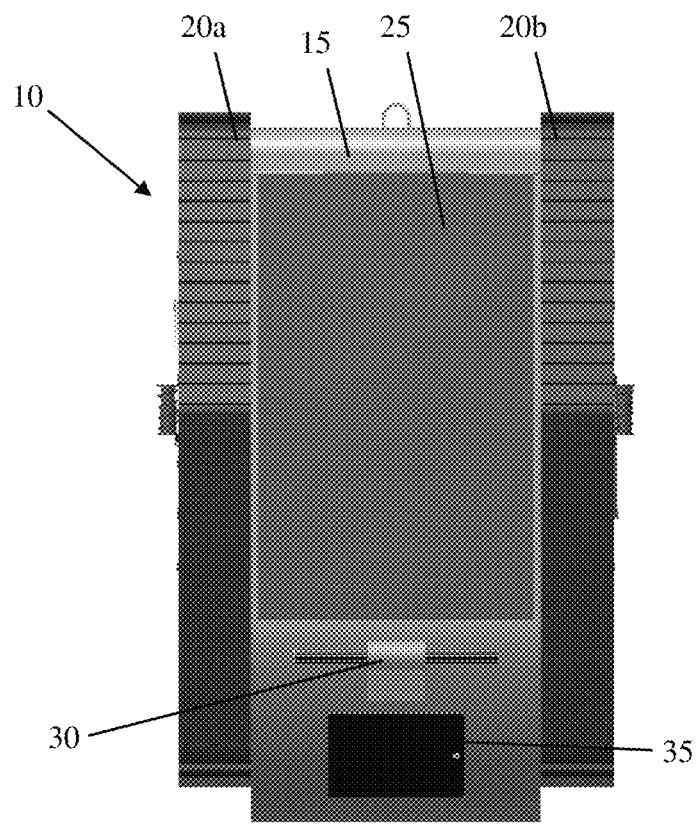
FIGS. 4 and 5 show top views of the machine in accordance with aspects of the invention.
Figure 5:
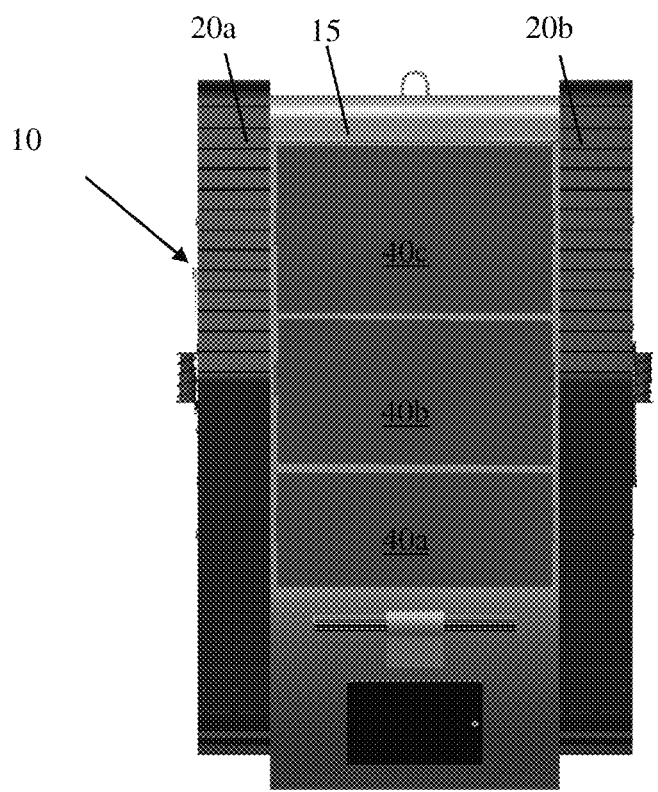

FIG. 3A shows the machine 10 with the cover 25 removed, thereby exposing modules 40a-c contained in bays 45a-c in the body 15. FIG. 3B shows an underside of the machine 10 illustrating the empty bays 45a-c. FIG. 4 shows a top view of the machine 10 with the cover 25 connected in place on the top of the body 15, and FIG. 5 show the top view with the cover 25 removed. As described in greater detail herein, each individual module (e.g., module 40a) is removable, housed in its associated bay (e.g., bay 45a).

Figure 6:
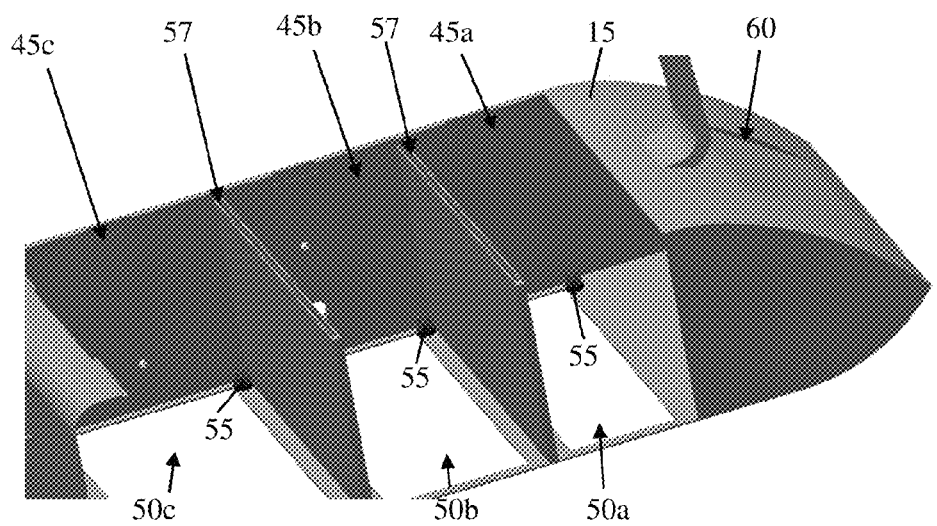
FIGS. 6-8 show partial cutaway views of the machine in accordance with aspects of the invention.
Figure 7:
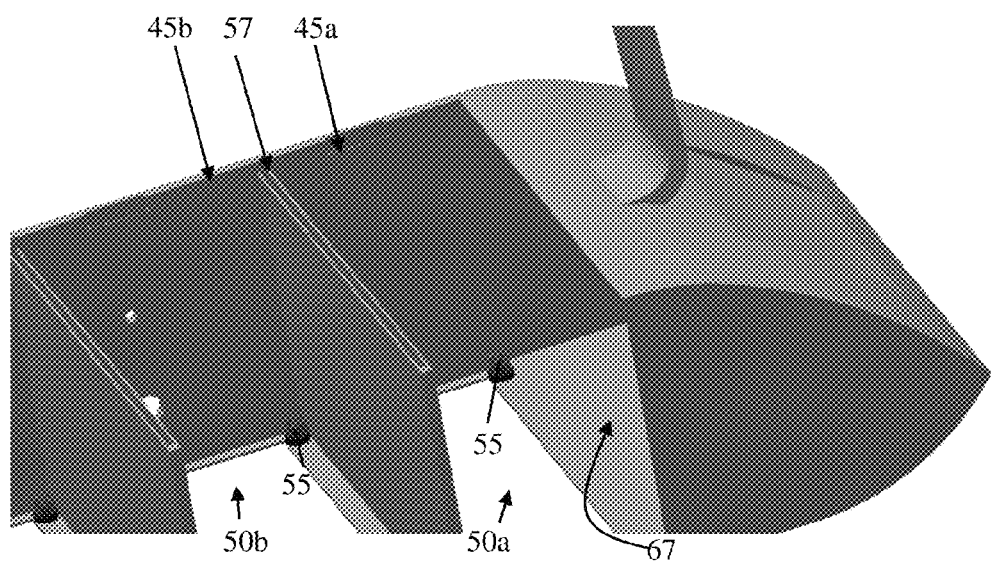
Figure 8:
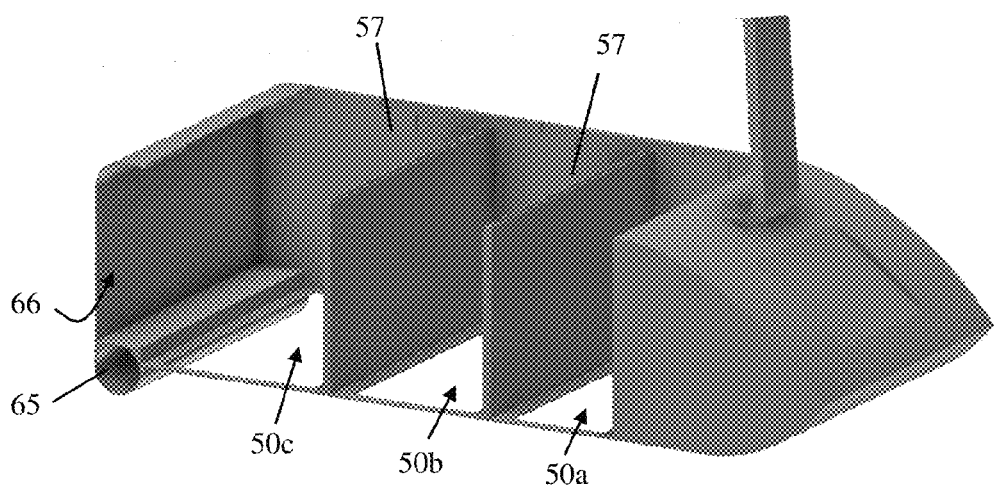

FIGS. 6-8 show partial cutaway views of the machine 10 in accordance with aspects of the invention. In particular, FIGS. 6-8 show empty bays 45a-c in the body 15. In embodiments, each bay 45a-c has an opening at the top of the body 15 that is sized to correspond to a module, such that a module may be selectively moved into and out of the bay via the opening. In this way, for example, a first type of module (e.g., a grass cutter) may be removed from bay 45a and a second type of module (e.g., a water sprayer) may be inserted into the same bay 45a. In this manner, different types of modules may be selectively placed into each respective bay 45a-c, e.g., depending on the type of work that is desired to be performed by the machine 10.

Still referring to FIGS. 6-8, each bay 45a-c also has a respective opening 50a-c at the bottom of the body 15. These openings at the bottom of the body 15 are configured to permit a portion of a module to extend outward from the bottom of the body 15. For example, the openings at the bottom of the body 15 permit a lawn mower blade, tiller blade(s), water jet nozzle, etc., protrude outward from the body 15.

As shown in FIGS. 6 and 7, in embodiments each bay 45a-c includes a respective power connector 55 that is affixed to the body 15 and is configured to operatively connect to a corresponding power connector of a module when the module is inserted into the bay. For example, the power connector 55 may be an electrical plug style connector that, when connected to a corresponding power connector of a module, forms a conductive pathway for providing electrical power from a power source carried by the body 15 to a device inside the module.

With continued reference to FIGS. 6-8, the body 15 may contain walls 57 between each of the bays 45a-c. The walls 57 and the sidewalls of the body 15 may be appropriately sized and shaped to define each bay 45a-c with a shape corresponding to an exterior shape of a module. In this manner, the walls 57 and the sidewalls of the body 15 may be used to guide proper insertion of the modules into the bays. In a particular embodiment, each bay 45a-c is configured, e.g., via the walls 57 and the sidewalls of the body 15, such that a corresponding module can only fit into the bay in a single orientation that aligns the power connector 55 in the bay with a corresponding power connector of a module. In this manner, when a module is inserted into a bay, the power connectors are aligned and automatically connected to one another to form the power-providing path to the module.

FIG. 8 shows an exemplary location of a drive mechanism 65 that provides motive power to the propulsion systems 20a and 20b. The drive mechanism 65 may include, for example, two separate electric motors that individually drive the respective propulsion systems 20a and 20b. One or more rechargeable batteries may be located anywhere within the body 15 including: at a rear 66 of the body 15, at a front 67 of the body 15, and/or between respective ones of the bays 45a-c as described in greater detail herein. Control electronics may also be located anywhere within the body 15, and are preferably located in the front (e.g., nose) 67 of the body 15. Electrical wiring between the batteries, power connectors 55, control electronics, and interface (e.g., dashboard) may be routed in any suitable manner in or on the body 15, including having wires routed within walls 57. Moreover, the body 15 may include a recess 60 that is sized and shaped to correspond to a tablet computer that functions as the interface 35.

Figure 9:
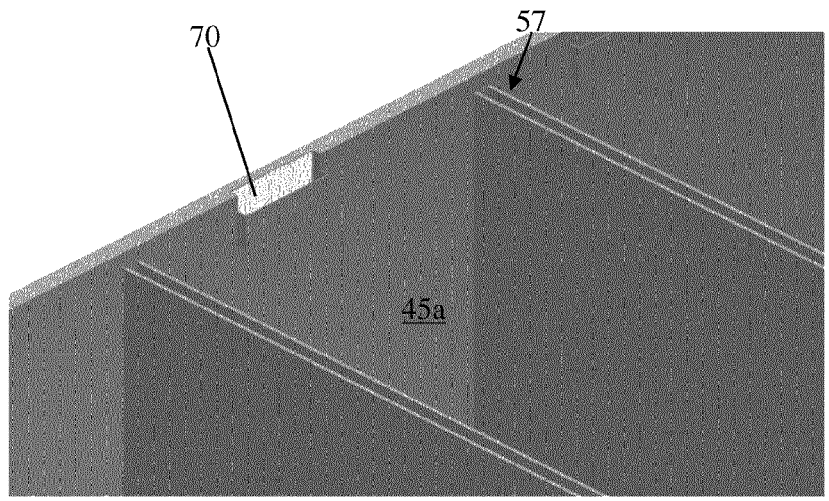
FIGS. 9-14 show aspects of modules of the machine in accordance with aspects of the invention.

FIGS. 9-14 show aspects of the bays and modules of the machine 10 in accordance with aspects of the invention. As shown in FIG. 9, each bay (e.g., as depicted by representative bay 45a) may include locking mechanisms 70 that engage and retain a module within the bay. In embodiments, the locking mechanisms 70 comprise resiliently biased clips that are pushed outward when a module is being inserted into a bay, and that spring back inward to engage a locking surface of the module when the module is fully received in the bay. The locking mechanisms 70, when engaged with the locking surface of the module, prevent the module from being moved out of the bay. To remove a module, a user may manually push the clips outward, i.e., to disengage the clip from the locking surface of the module, and lift the module out of the bay.

Figure 10:
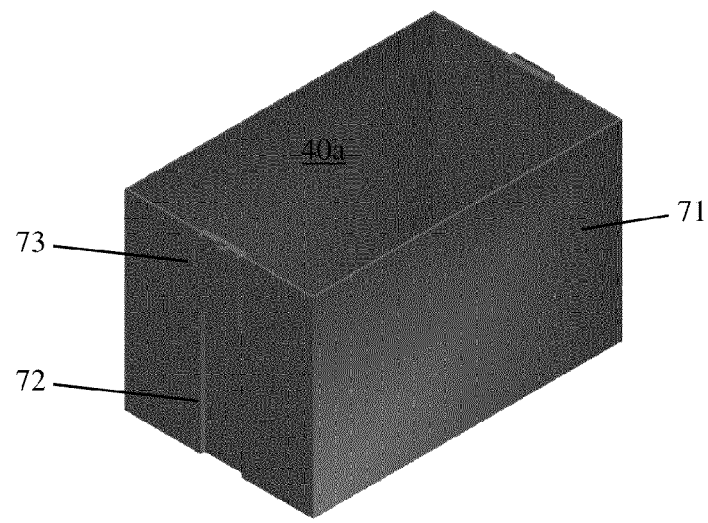
Figure 11:
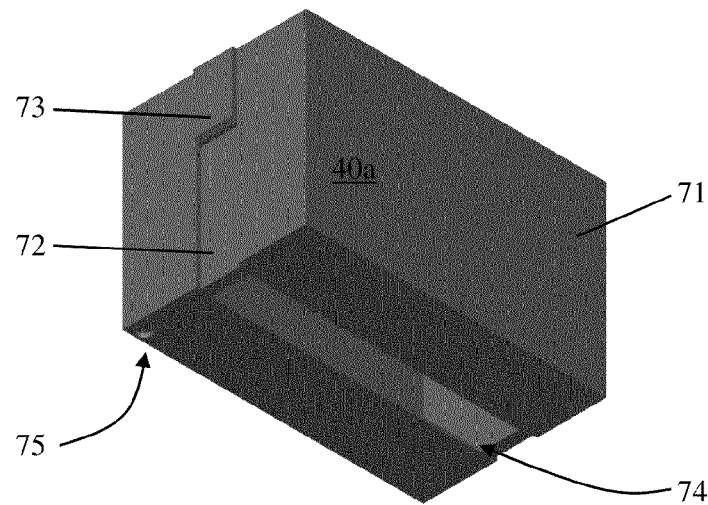

As shown in FIGS. 10 and 11, each module (e.g., as depicted by representative module 40a) may include a frame 71 that is sized and shaped to fit within a corresponding bay in the body of the machine. The frame 71 may include four sidewalls and a bottom wall. The frame 71 may be provided with or without a top wall, e.g., to enclose the module or provide access to the machinery inside the module. The frame 71 may include one or more grooves 72 and/or one or more protrusions 73 that correspond in size, shape, and location to corresponding structures in a bay, i.e., to provide structural guide elements for sliding the module into the bay in a predefined orientation and to prevent movement/jostling of a module within a bay when the module is installed in the bay. The frame 71 may include an opening 74 at the bottom wall to permit a portion of the module (e.g., a blade, etc.) to extend outward through the opening 74. The frame 71 may also include a power connector 75 that corresponds to a connector 55 in one of the bays, as already described herein.

In an embodiment, the computer controller of the machine 10 automatically determines the type of interchangeable module that is installed in any one of the bays. This may be accomplished in a number of ways. For example, the power connector 75 on each module may have a unique number and/or arrangement of pins that interface with the power connector 55, and the computer controller of the machine 10 may determine the type of module based on the unique number and/or arrangement of pins.

Figure 12:
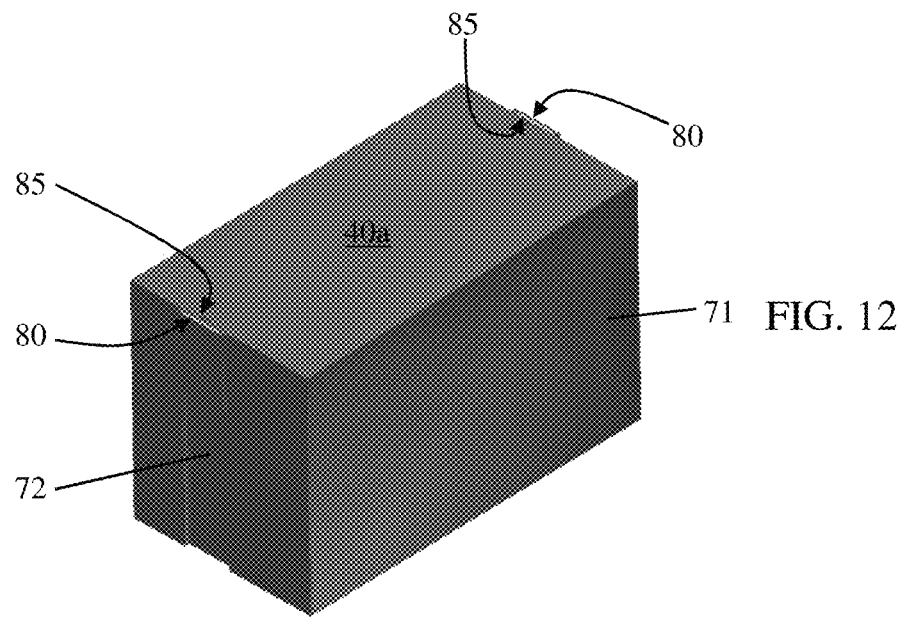
Figure 13:
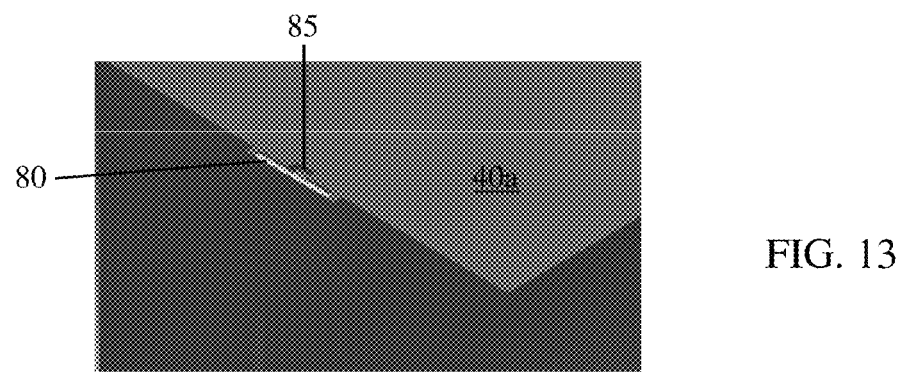
Figure 14:
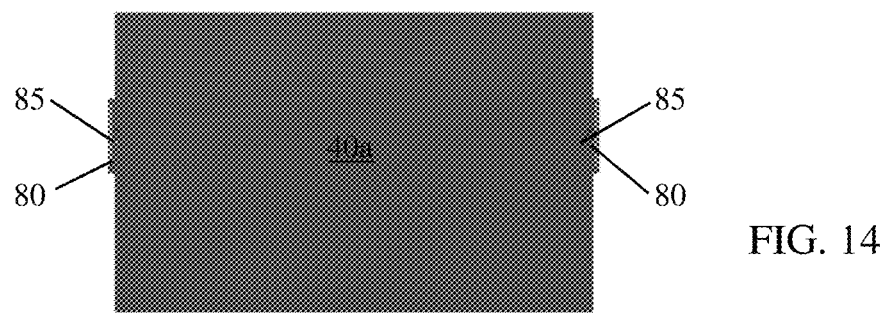

FIGS. 12-14 show handles 80 that are associated with a module, e.g., module 40a. In embodiments, the handles 80 are retractable down into side walls of the module frame 71 so that the top of the handles 80 are flush with the top of the frame 71 when the handles 80 are retracted. In this manner, the handles 80 may be hidden when not in use. In embodiments, the frame 71 includes a groove 85 or the like that is sized and shaped to permit a user to utilize a finger or tool to engage the handle 80 in order to move the handle 80 from the retracted position to an extended position. One or more structural stops may be used to define the range of movement of the handle, i.e., to stop the handle at the extended position where the user may then use the handle to lift the module out of the bay.

Figure 15:
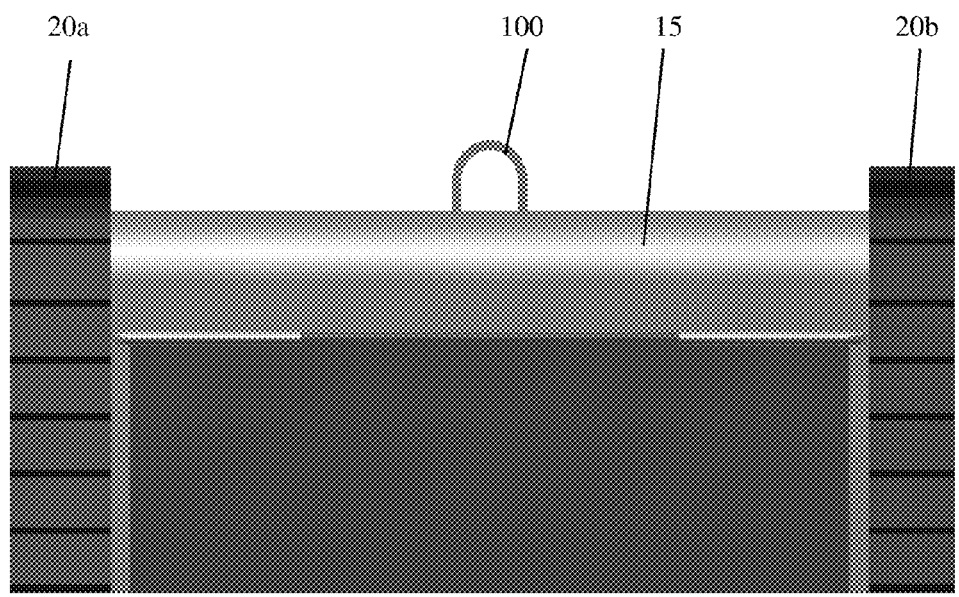
FIGS. 15-17 show a tow hook of the machine in accordance with aspects of the invention.
Figure 16:
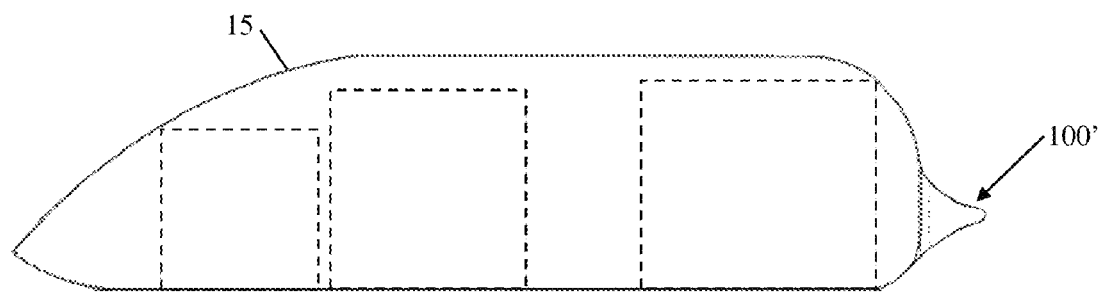
Figure 17:
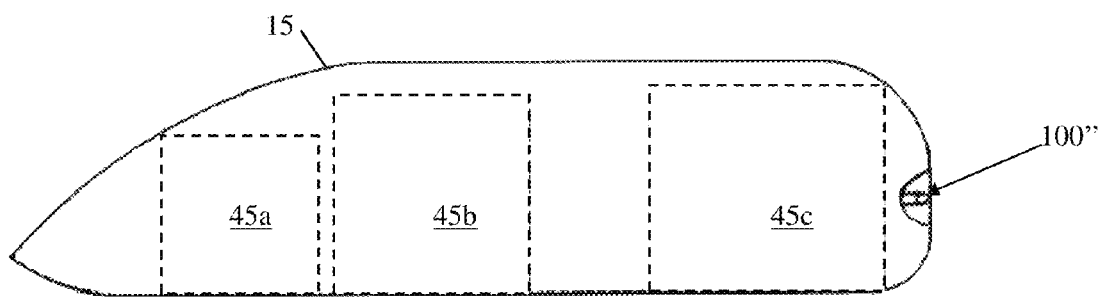

FIGS. 15-17 show variations of a tow hook that may be used with the machine 10 in accordance with aspects of the invention. FIG. 15 shows a D-ring tow-hook 100 extending outward from a back surface of the body 15 between propulsion systems 20a and 20b. FIG. 16 shows a tow hook 100' that is integrated as part of the body 15 and extends outward from a substantially vertical surface at the rear of the machine 10. FIG. 17 shows a tow hook 100" in a recess 105 at the rear of the body 15. The tow hook 100/100'/100" may be used to tow objects with the machine 10.

Figure 18:
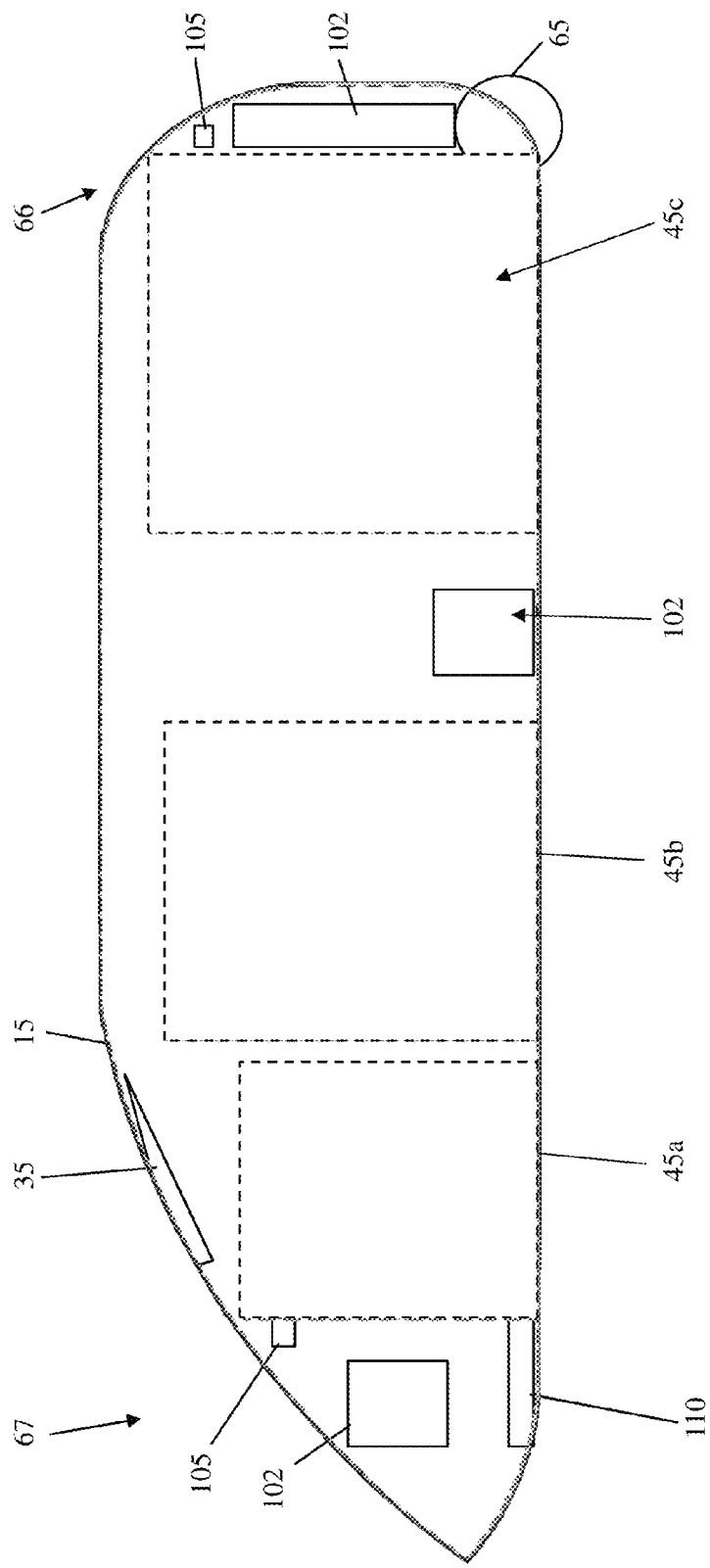
FIGS. 18 and 19 show exemplary aspects of the machine in accordance with aspects of the invention.

FIG. 18 shows dimensions of the body 15 and bays 45a-c of an exemplary implementation of the machine 10. The machine 10 is not limited to the dimensions shown in any figure and/or described herein; instead, any suitable dimensions may be used within the scope of the invention. The dimensions shown in FIG. 18 are in inches.

In the implementation shown in FIG. 18, the first bay 45a is about 8×8×24 inches, the second bay 45b is about 10×10×24 inches, and the third bay 45c is about 12×10.5×24 inches. In another implementation, the first bay 45a is about 6×10×24 inches, the second bay 45b is about 8×10×24 inches, and the third bay 45c is about 10×10×24 inches. Other dimensions may be used within the scope of the invention. As depicted in FIG. 18, the different bays 45a-c may have different dimensions to accommodate different sized modules, which are of different sizes due to containing different sizes of motors and types of components. In an embodiment, each bay (e.g., 45a) has dimensions that are different from the other two bays (e.g., 45b and 45c) to accommodate different modules that serve different purposes and thus require different amounts of space. In a preferred embodiment, the third bay 45c is the largest of the bays and is located furthest to the rear of the body 15 for the purpose of providing the largest and heaviest modules at the rear of the body 15.

Still referring to FIG. 18, the power supply for the machine 10 may be located at any suitable location inside or on the body 15. For example, batteries 102 may be located at any one or more of: the front 67 of the body 15 ahead of the first bay, the middle of the body 15 between two bays, and the rear 66 of the body 15 behind the last bay. Sensors, such as cameras 105 and metal detector 110, may be located in the body 15. Dashboard 35 may also be located on or within the body 15. The dashboard 35 may include the computer controller and a GPS receiver, and may be wired to the various sensors and power supply. Drive mechanism 65 may be located toward the rear of the body 15.

Figure 19:
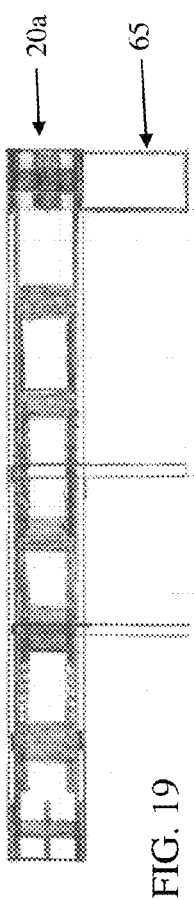

FIG. 19 shows an exemplary drive mechanism 65 and propulsion mechanism 20a. In embodiments, each propulsion mechanism 20a and 20b may be a tank-like track that is individually driver by its own dedicated drive mechanism 65, which may comprise a high-torque electric motor.

Figure 20:
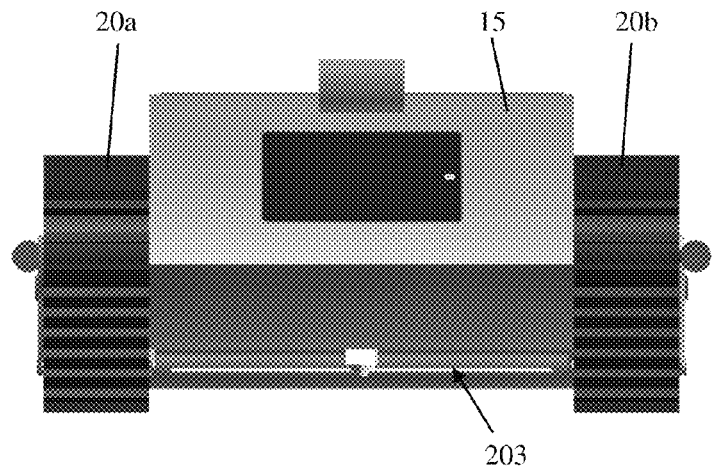
FIGS. 20-24 show exemplary modules of the machine in accordance with aspects of the invention.
Figure 21:
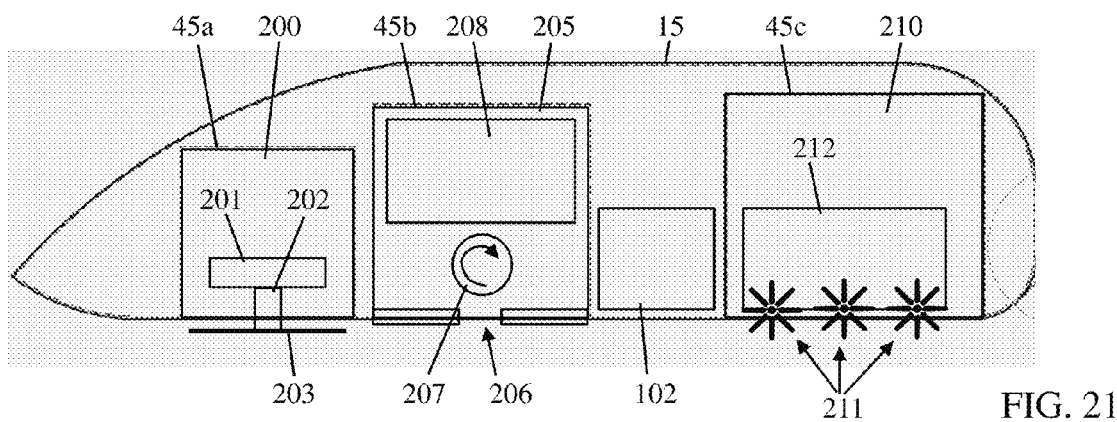

FIGS. 20-24 show exemplary aspects of respective types of modules in accordance with aspects of the invention. For example, FIG. 20 shows a cutting element 203 of a weed/grass trimmer module extending downward from the bottom of the body 15, e.g., between the bottom surface of the body 15 and the ground. As shown in FIG. 21, the cutting element 203 is part of a weed/grass trimmer module 200 that is arranged in the first bay 45a. The weed/grass trimmer module 200 may include, for example, a frame (e.g., frame 71) that houses a motor 201 and drive shaft 202 for spinning the cutting element 203. The motor 201 may be an electric motor that is driven by power provided by the power source (e.g., batteries) carried by the body 15, and conveyed to the module via the power connectors (e.g., mated power connectors 55 and 75). The weed/grass trimmer module 200 may also include an adjustment mechanism that is configured to adjust a height of the cutting element 203 relative to the body 15, e.g., to accommodate cutting grass at different desired heights.

Still referring to the exemplary implementation shown in FIG. 21, the machine 10 includes a leaf vacuum shredder module 205 in the second bay 45b. In embodiments, the leaf vacuum shredder module 205 includes a suction port 206 into which leaves are sucked, a shredder 207 that shreds the leaves, and a holding chamber 208 for accumulating the shredded leaves. The leaf vacuum shredder module 205 may include a motor to provide the suction force and power the shredder. The holding chamber 208 may be internal to a frame of the leaf vacuum shredder module 205. Alternatively, the holding chamber 208 may comprise a bag that is hung on or otherwise carried by the body 15, and the leaf vacuum shredder module 205 may include a conduit that routes the shredded leaves to the bag.

Still referring to the exemplary implementation shown in FIG. 21, the machine 10 includes a rototiller module 210 in the third bay 45c. In embodiments, the rototiller module 210 includes a frame that houses a motor 211 that drives one or more tiller blades 211. The motor 212 may be power by electricity provided by the power supply of the machine 10. alternatively, the motor 212 may be a gasoline motor that provides its own power for powering the tiller blades 211. The rototiller module 210 may also include an adjustment mechanism that is configured to adjust a height of the tiller blades 211 relative to the body 15, e.g., to accommodate tilling at different desired depths. In some implementations, the rototiller module 210 is arranged in the third bay 45c because it is the heaviest module.

Figure 22:
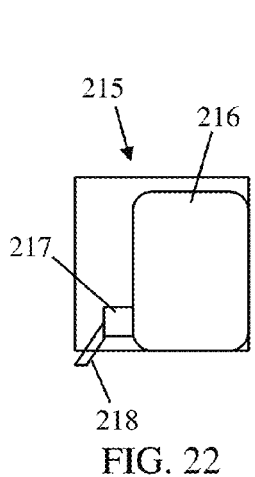
Figure 23:
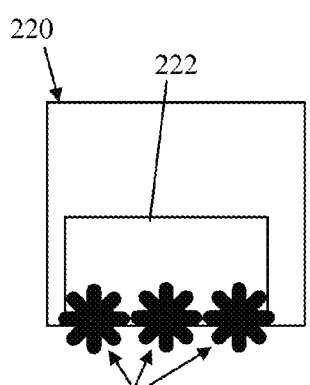
Figure 24:
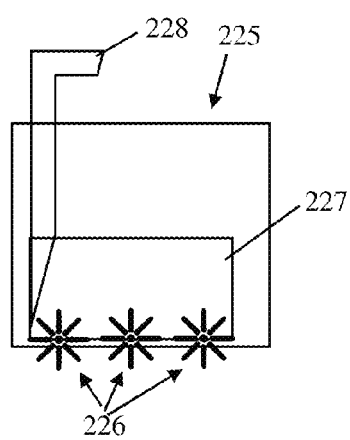

FIGS. 22-24 show aspects of other exemplary modules in accordance with aspects of the invention. FIG. 22 shows a water jet module 215 that may include, for example, a frame that carries a water tank 216, a pump 217, and a nozzle 218. In embodiments, the pump 217 is power by electricity provided by the batteries in the body via the mated power connectors. The pump 217 pressurizes water from the tank 216 and directs the pressurized water to the nozzle 218 for spraying a water jet from the nozzle 218. In embodiments, the water jet module 215 is sized to fit only in the first bay 45a.

FIG. 23 shows a rake/broom module 220 that may include, for example, a frame that carries a motor 222 and one or more rake/broom heads 221. In embodiments, the motor 222 is power by electricity provided by the batteries in the body via the mated power connectors, and drives movement, e.g., rotation, of the rake/broom heads 221.

FIG. 24 shows a snow blower module 225 that may include, for example, a frame that carries a motor 227, at least one snow screw 226, and a snow exhaust conduit 228. In embodiments, the motor 227 is power by electricity provided by the batteries in the body via the mated power connectors, and drives movement of the at least one snow screw 226. The motor 227 may also power a blower that takes snow from the at least one snow screw 226 and blows it out through the exhaust conduit 228.

Figure 25B:
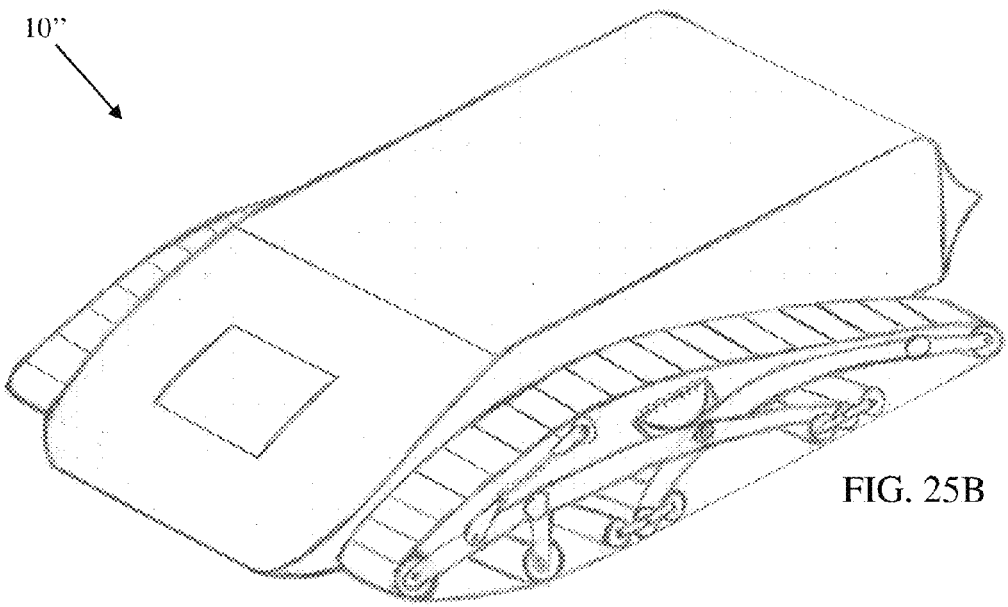
FIGS. 25A and 25B show perspective views of implementations of a machine in accordance with aspects of the invention.
Figure 25A:
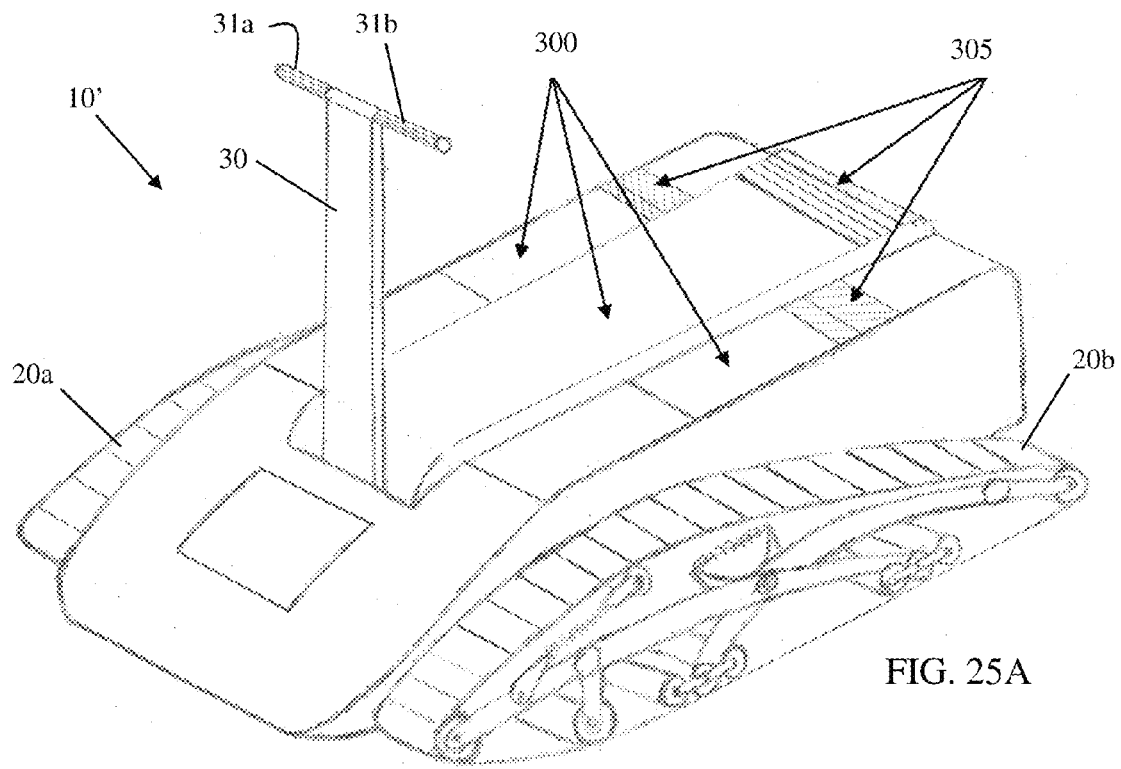

FIGS. 25A and 25B show perspective views of implementations of a machine in accordance with aspects of the invention. FIG. 25A shows an embodiment of machine 10' having a platform with three foot areas 300 and brake areas 305. A user standing on the platform may apply a braking force to the propulsion systems 20a and 20b by stepping on one of the brake areas 305. FIG. 25B shows an embodiment of the machine 10" that is designed for autonomous or remote control only, as it is devoid of a handlebar 30 and throttles 31a and 32b.

Figure 26:
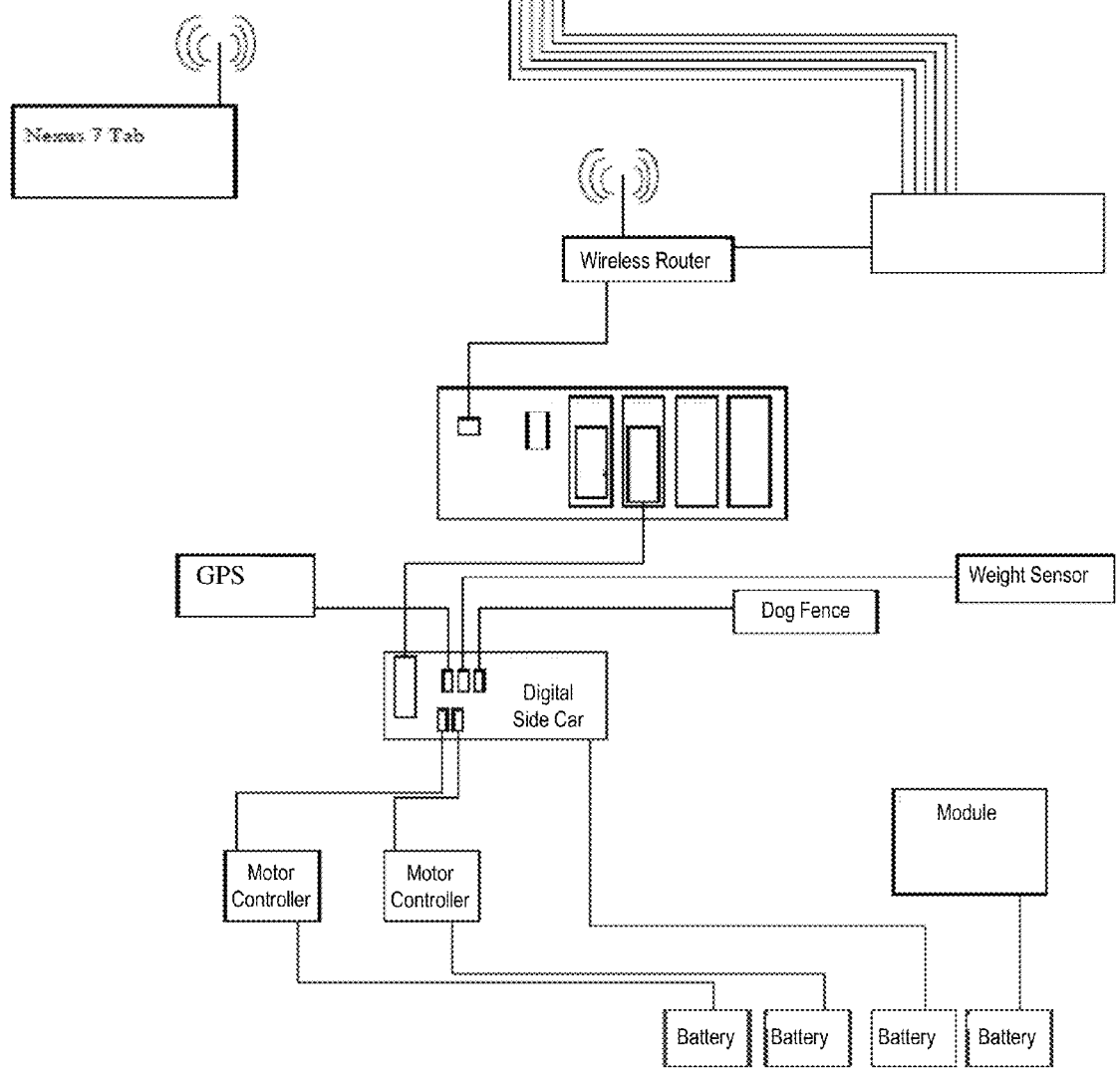
FIG. 26 shows an exemplary control system in accordance with aspects of the invention.

FIG. 26 shows an exemplary control system in accordance with aspects of the invention. The control system may include a computer device, e.g., computer controller, comprising a memory, a processor, and an input/output device. The control system may also include various sensors mounted on the machine and operatively connected to the processor. The control system may also include a GPS receiver operatively connected to the processor. The control system may also include a wireless communication antenna operatively connected to the processor.

FIGS. 27, 28, 29A, and 29B show movement control configurations of the machine 10 in accordance with aspects of the invention. There may be plural different movement configurations. For example, the machine 10 may be controlled to go back and forth in a pattern, in a circle, in a square pattern, a left or right only pattern and random pattern which goes left or right depending on the location the camera that detects the objects.

Figure 27:
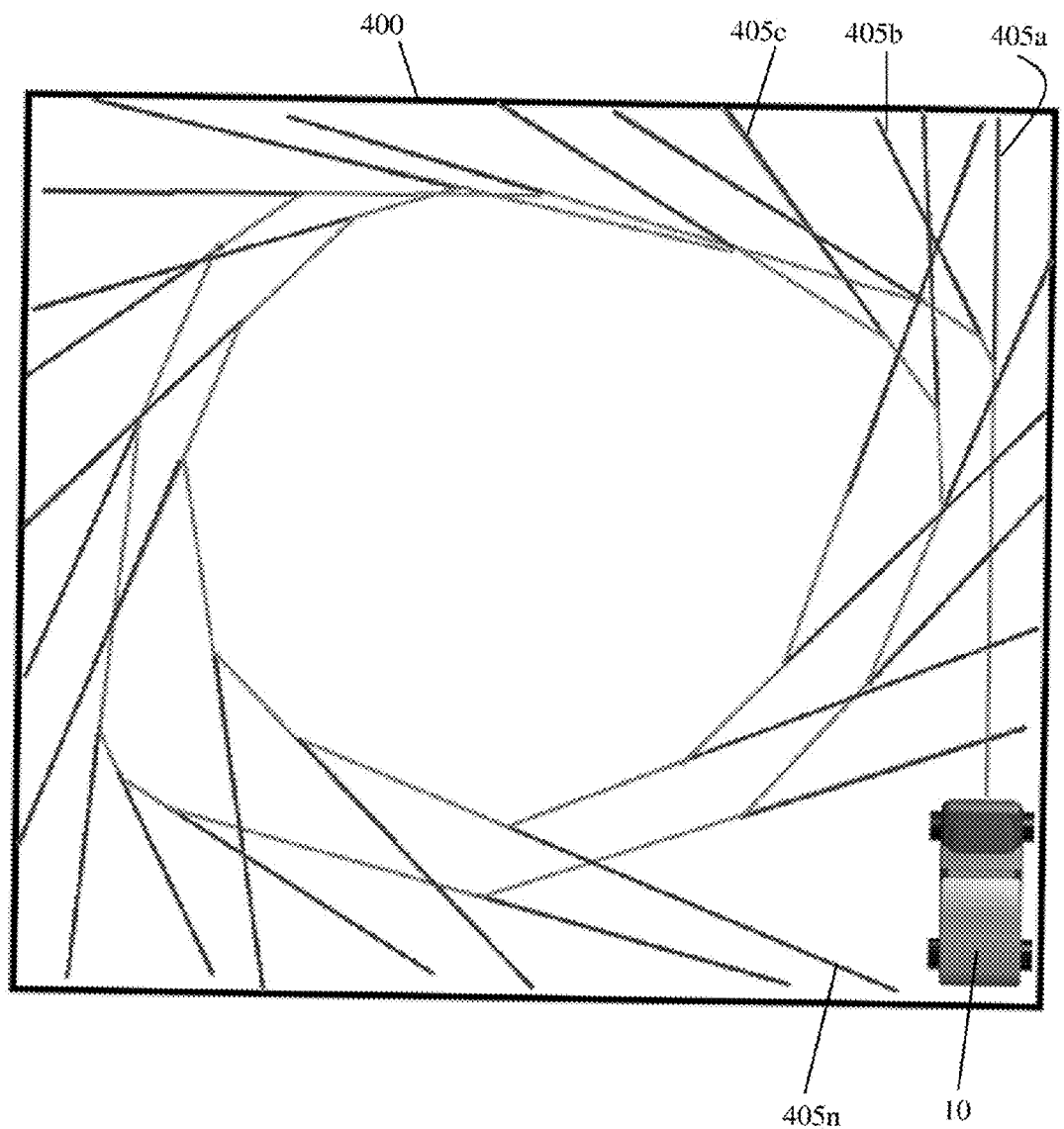
FIGS. 27, 28, 29A, and 29B show control configurations in accordance with aspects of the invention.

FIG. 27 shows an embodiment of an autonomous left only movement pattern of the machine 10 in an enclosed area 400, e.g., a fenced-in yard with a physical barrier around its perimeter. In this exemplary configuration, the machine 10 is configured to move straight forward until its proximity sensors detect an object/obstacle, at which point the machine moves straight back a predefined distance (e.g., 3 ft), turns a predefined angle to the left (e.g., 30°), and then moves straight forward until its sensors detect an object/obstacle. In this manner, the machine 10 autonomously moves along a plurality of paths 405a-n until it eventually reaches every part of the area 400. Of course, the invention is not limited to a left only movement pattern, and the machine may be programmed to perform a right only movement pattern instead.

Figure 28:
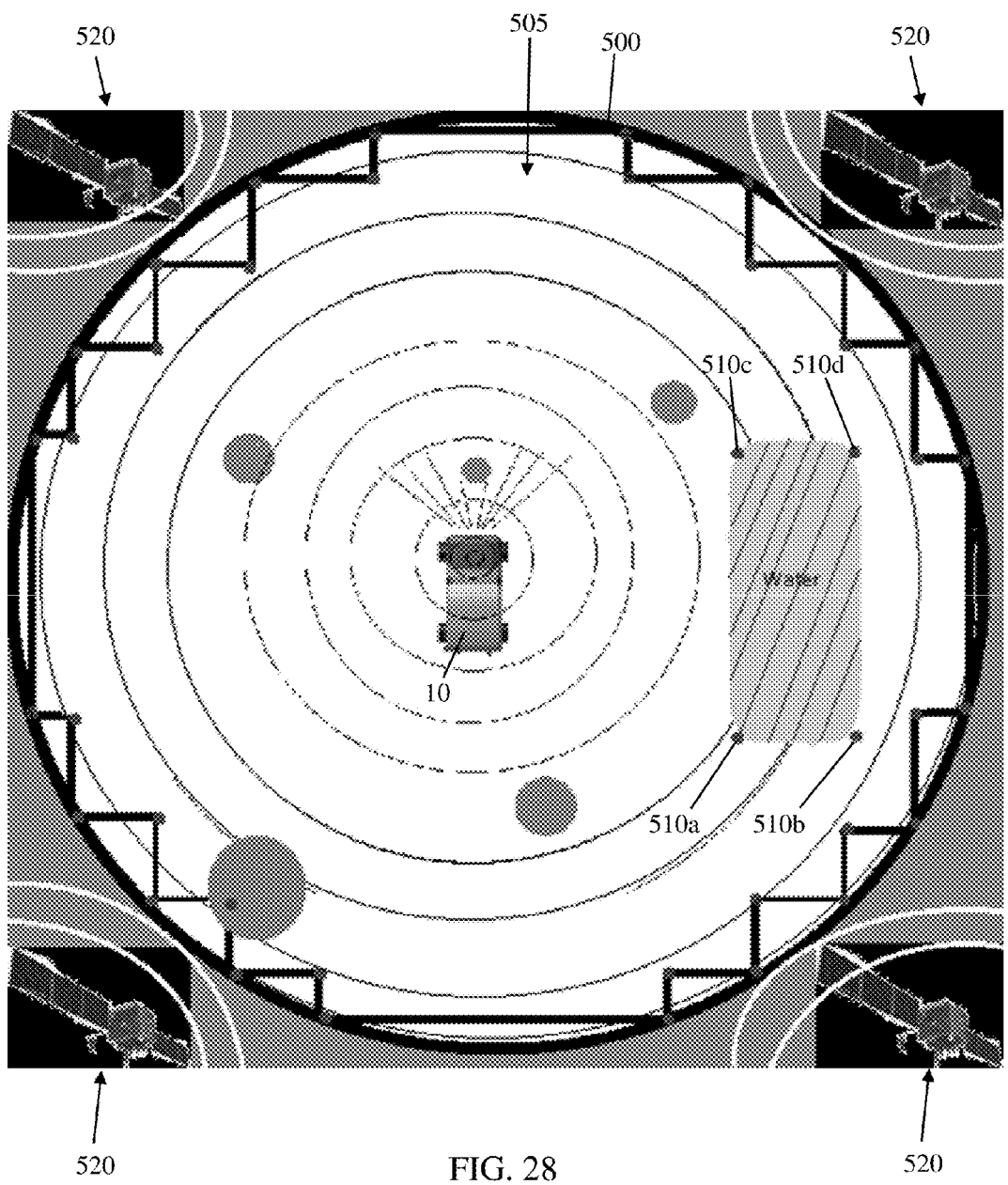

FIG. 28 shows an embodiment of an autonomously left only movement pattern implemented with a metal detector and using GPS. As shown in FIG. 28, the outer circle 500 defines an area 505 that may be defined by a wire that is detectable by the machine 10, e.g., in a manner similar to an invisible fence. The dots 510 represent GPS waypoints that may define areas where the machine 10 avoids traveling. For example, the dots 510a-d define a water obstacle that the machine 10 is programmed to avoid. Using the coordinates of the dots 510a-d and the GPS data received from the satellites 520, the controller of the machine 10 can avoid traveling over the water obstacle. In this example, the machine may operate using the left only movement pattern that is bound by the outer circle 500 and the metal detector. As the machine is performing this movement, the machine may also utilize the GPS points 510 to avoid moving through obstacles inside the area 505. In this manner, the machine 10 uses sensors (e.g., metal detectors) and GPS at the same time to autonomously control movement within an area.

Figure 29A:
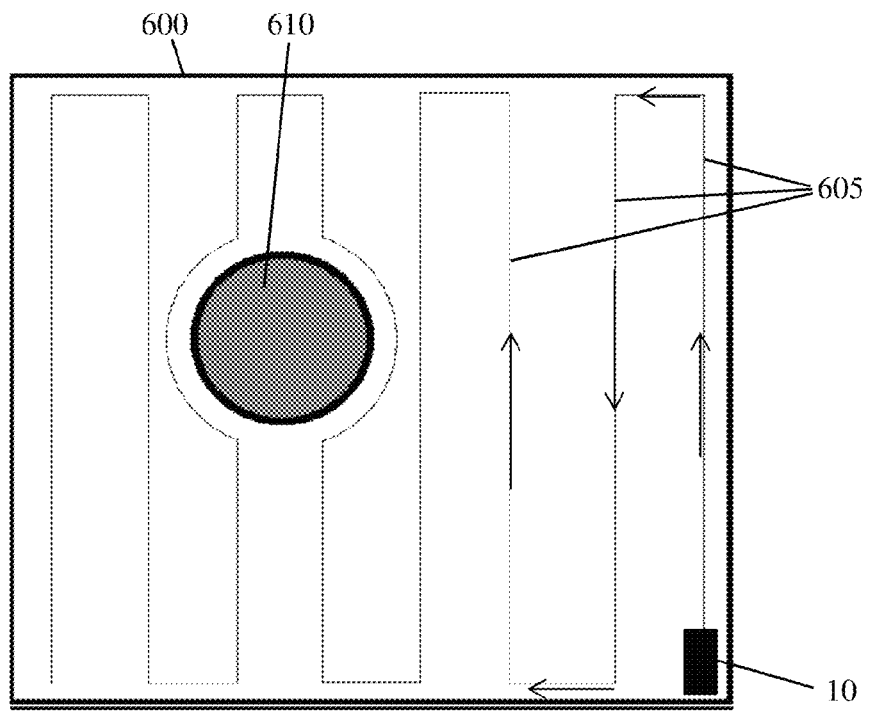

FIG. 29A shows an autonomous, left-organized back and forth pattern. In embodiments, the machine 10 moves straight until the machine 10 reaches a boundary 600. The machine 10 may detect the boundary in any manner described herein, e.g., proximity sensors, metal detectors, GPS coordinates. When the machine 10 detects the boundary 600, the machine 10 turns 90° to the left, travels a predefined distance (e.g., about 2 feet), turns 90° to the left again, and then travels in a straight line until it reaches the boundary 600 again. By repeating this process, the machine 10 autonomously travels a plurality of parallel paths 605 within the confines of the boundary 600. The predefined distance of the short legs of the path may be sized according to the size of the machine 10, so as to avoid overlapping areas that have already been traveled over. The machine 10 can also be configured to avoid travelling over an obstacle 610 (e.g., a pool) using camera sensors and/or GPS coordinates.

Figure 29B:
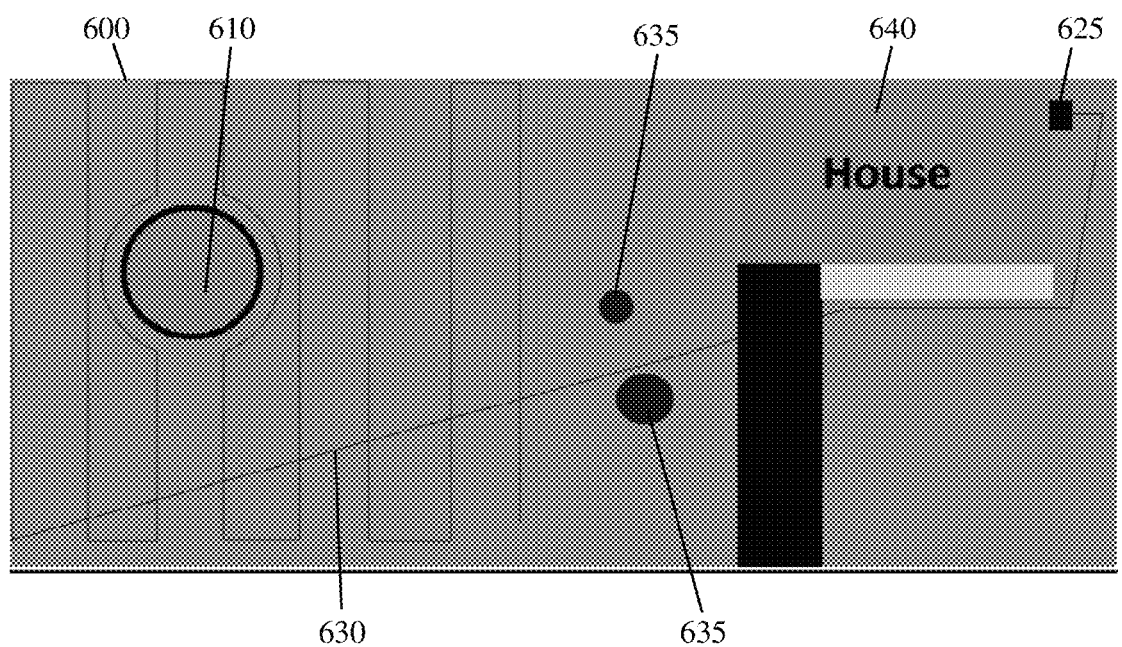
Figure 30:
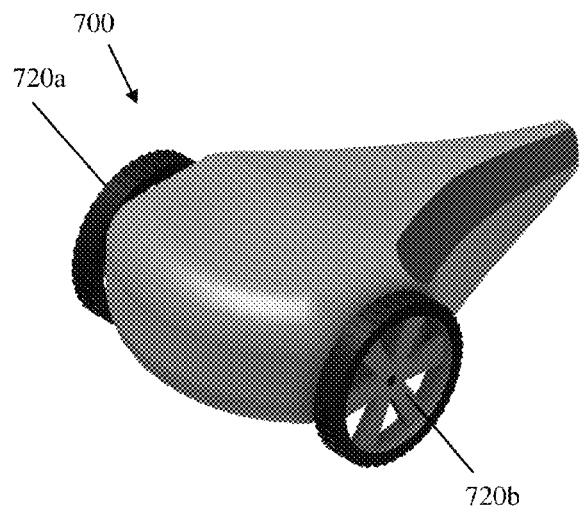
FIGS. 30-33 show views of a third embodiment of a machine in accordance with aspects of the invention.
Figure 31:
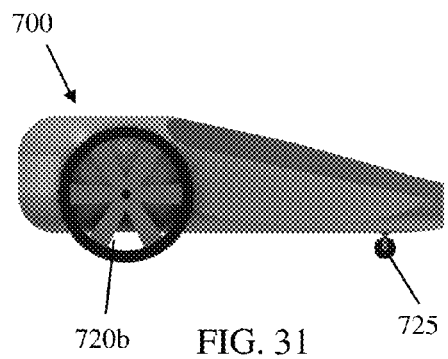
Figure 32:
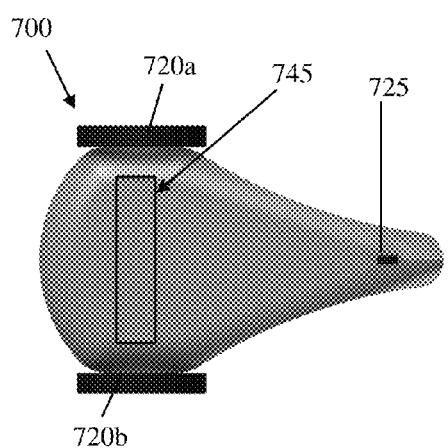
Figure 33:
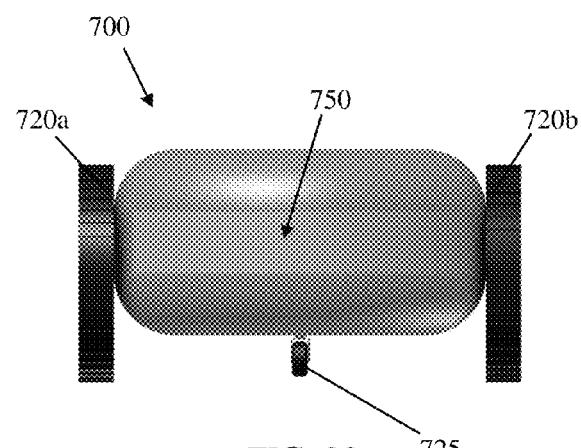

FIG. 29B shows an example of the machine autonomously traveling back to a predefined location 625 after completing work in the area 600. In embodiments, the machine 10 is programmed with GPS coordinates of the predefined location 625, e.g., a charging station, garage, shed, etc. After completing the work in the area 600, the machine 10 turns itself to travel in a straight line 630 toward the predefined location 625. For example, the machine 10 may automatically calculate how far it went and the route it took, and then automatically plot a direct route from the finished location of the job to the predefined location 625. When traveling toward the predefined location 625, the machine 10 still utilizes sensors to avoid running into or over obstacles, such as bushes 635, houses 640, fences, etc.

In further aspects of the invention, a GPS boundary may be defined for the machine 10 using a mapping application. In this embodiment, a GPS extractor mapping application that is run on a smartphone, tablet computer or the like, is configured to permit a user to draw a boundary on a map. For example, the mapping application may display a map and detect touch screen input of a user's finger tracing a boundary on the displayed map. Upon receiving the user-defined boundary, the mapping application may convert the boundary to GPS coordinates and wirelessly transmit the GPS coordinates to the computer controller of the machine 10. The machine 10 then moves autonomously within the area defined by the GPS coordinates.

FIGS. 30-33 show views of a third embodiment of a machine 700 in accordance with aspects of the invention. The machine 700 is similar to machine 10 is that it contains a power supply, propulsion system, computer controller, and sensors/GPS for autonomous movement in the same manner as described with respect to machine 10. The propulsion system may include drive wheels 720a and 720b that may be independently driven in forward and reverse. Each drive wheel may have its own drive motor that can turn the wheel in forward or reverse. A third wheel 725 at the rear swivels.

In aspects described herein, the machine 700 is smaller than machine 10 in that machine 700 only includes a single bay 745 for receiving a module. In this manner, machine 700 carries only one module at any given time. The machine 700 may include one or more sensors 750, such as a camera, sonar, metal detector, etc., that operate in the same manner as the sensors described with respect to machine 10. The machine 700 may be configured to carry any of the types of modules described with respect to machine 10.

It is noted that the foregoing examples have been provided merely for the purpose of explanation and are in no way to be construed as limiting of the present invention. While the present invention has been described with reference to an exemplary embodiment, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A machine, comprising:
   a body;
   a plurality of bays in the body, wherein each bay is configured to receive a respective module;
   a power source carried by the body;
   a respective power connector in each one of the bays that is configured to provide an electrically conductive path between the power source and a device in a said module arranged in one of the bays;
   a propulsion system structured and arranged to move the body over the ground; and
   a control system structured and arranged to control autonomous movement of the machine based on at least one of: proximity sensors, metal detectors, and GPS data,
   wherein the plurality of bays comprises a first bay, a second bay, and a third bay, all of different sizes.

2. The machine of claim 1, wherein the modules are selected from a group consisting of: leaf vacuum shredder module; rototiller module; weed/grass trimmer module; air compressor module; external vacuum with hose module; water jet module; rake/broom module; snow blower module; shovel module; and broadcast spreader module.

3. The machine of claim 1, wherein a largest of the first bay, the second bay, and the third bay is at a rear end of the body.

4. The machine of claim 1, further comprising a dashboard that provides a user with an interface for providing input to the control system.

5. The machine of claim 4, wherein the dashboard is a touch screen GUI mounted on the body.

6. The machine of claim 1, wherein the propulsion system comprises:
   first and second treads on opposite sides of the body;
   a first electric motor connected to and adapted to drive the first tread; and
   a second electric motor connected to and adapted to drive the second tread.

7. The machine of claim 6, further comprising a handlebar including a first throttle that controls the first tread and a second throttle that controls the second tread independent of the first tread.

8. The machine of claim 1, wherein the power source comprises at least one re-chargeable battery.

9. The machine of claim 8, wherein the at least one re-chargeable battery comprises:
   a first battery dedicated to a first motor of the propulsion system;
   a second battery dedicated to a second motor of the propulsion system;

a third battery dedicated to providing power to said module via said power connector; and a fourth battery dedicated to providing power to said control system.

10. The machine of claim 1, further comprising a remote control system that is adapted to permit a user to control movement of the propulsion system using a hand-held wireless remote control unit that overrides the autonomous movement.

11. The machine of claim 1, further comprising a tow hook sticking out from or embedded into the rear end of the body.

12. The machine of claim 1, wherein the control system is programmed to cause the machine to move to a charging station after completing a task.

13. A machine, comprising:
a body;
a plurality of bays in the body, wherein each bay is configured to receive a respective module;
a power source carried by the body;
a respective power connector in each one of the bays that is configured to provide an electrically conductive path between the power source and a device in a said module arranged in one of the bays;
a propulsion system structured and arranged to move the body over the ground; and
a control system structured and arranged to control autonomous movement of the machine based on at least one of: proximity sensors, metal detectors, and GPS data, wherein:
the plurality of bays and the modules are sized and shaped such that a said module only fits into one of the plurality of bays in a single orientation; and
the single orientation aligns the respective said power connector of the bay with a corresponding power connector of the module.

14. A machine, comprising:
a body;
a plurality of bays in the body, wherein each bay is configured to receive a respective module;
a power source carried by the body;
a respective power connector in each one of the bays that is configured to provide an electrically conductive path between the power source and a device in a said module arranged in one of the bays;
a propulsion system structured and arranged to move the body over the ground; and
a control system structured and arranged to control autonomous movement of the machine based on at least one of: proximity sensors, metal detectors, and GPS data, wherein the control system automatically determines a type of interchangeable module that is installed in any one of the module locations.

15. A system, comprising:
a machine; and
a plurality of modules;
wherein the machine comprises:
a body;
a first bay, a second bay, and a third bay, all of different sizes in the body, wherein each said bay is configured to receive a respective one of the plurality of modules;
a power source carried by the body;
a respective power connector in each said bay that is configured to provide an electrically conductive path between the power source and a device in the respective one of the plurality of modules arranged in each said bay;
a propulsion system structured and arranged to move the body over the ground; and
a control system structured and arranged to control autonomous movement of the machine based on at least one of: proximity sensors, metal detectors, and GPS data; and
wherein the plurality of modules are selected from a group consisting of: leaf vacuum shredder module; rototiller module; weed/grass trimmer module; air compressor module; external vacuum with hose module; water jet module; rake/broom module; snow blower module; shovel module; and broadcast spreader module.

16. The system of claim 15, wherein the machine further comprises a dashboard that provides a user with an interface for providing input to the control system, wherein the dashboard is a touch screen GUI mounted on the body.

17. The system of claim 15, wherein:
the propulsion system comprises: first and second treads on opposite sides of the body; a first electric motor connected to and adapted to drive the first tread; and a second electric motor connected to and adapted to drive the second tread; and
the power source comprises: a first battery dedicated to the first electric motor; a second battery dedicated to the second electric motor; a third battery dedicated to providing power to said module via said power connector; and a fourth battery dedicated to providing power to said control system.

18. The system of claim 17, further comprising one of:
a handlebar including a first throttle that controls the first tread and a second throttle that controls the second tread independent of the first tread; and
a remote control system that is adapted to permit a user to control movement of the propulsion system using a hand-held wireless remote control unit that overrides the autonomous movement.

* * * * *